United States Patent
Barbeau et al.

(10) Patent No.: US 7,400,112 B2
(45) Date of Patent: *Jul. 15, 2008

(54) AUTOILLUMINATING RECHARGEABLE LAMP SYSTEM

(75) Inventors: Stéfane Barbeau, Roxsbury, MA (US); Daniel Reilly, Jamaica Plain, MA (US); Duane Smith, Roxbury, MA (US)

(73) Assignee: Helen of Troy Limited, St. Michael (BB)

( * ) Notice: Subject to any disclaimer, the term of this patent is extended or adjusted under 35 U.S.C. 154(b) by 50 days.

This patent is subject to a terminal disclaimer.

(21) Appl. No.: 11/460,512

(22) Filed: Jul. 27, 2006

(65) Prior Publication Data

US 2006/0262525 A1 Nov. 23, 2006

Related U.S. Application Data

(63) Continuation-in-part of application No. 11/161,689, filed on Aug. 12, 2005, which is a continuation-in-part of application No. 10/989,199, filed on Nov. 15, 2004, which is a continuation-in-part of application No. 10/292,007, filed on Nov. 9, 2002, now Pat. No. 6,819,080, which is a continuation-in-part of application No. 09/885,848, filed on Jun. 20, 2001, now Pat. No. 6,479,965.

(51) Int. Cl.
*H01M 10/46* (2006.01)
(52) U.S. Cl. ..................... 320/115
(58) Field of Classification Search ............... 320/107, 320/112, 114, 115; 362/154, 157, 183, 184, 362/186, 187
See application file for complete search history.

(56) References Cited

U.S. PATENT DOCUMENTS

| 3,277,358 | A | 10/1966 | Nicholl |
| 3,373,274 | A | 3/1968 | Kott |
| 3,418,552 | A | 12/1968 | Holmes |
| 3,517,185 | A | 6/1970 | Moore et al. |
| 3,576,990 | A | 5/1971 | Johnson et al. |
| 3,641,336 | A | 2/1972 | Boin |
| 3,746,877 | A | 7/1973 | Seiter et al. |
| 3,781,631 | A | 12/1973 | Nelson et al. |
| 3,809,882 | A | 5/1974 | Wetmore |
| 3,840,785 | A | 10/1974 | Roszyk et al. |

(Continued)

FOREIGN PATENT DOCUMENTS

DE 3938532 5/1991

(Continued)

*Primary Examiner*—Edward Tso
(74) *Attorney, Agent, or Firm*—Seyfarth Shaw LLP

(57) ABSTRACT

An autoilluminating rechargeable lamp system includes a set of one or more self-standing rechargeable lighting fixtures (luminaries) removably supported on a recharging and support member. The luminaries each include a light diffusor that may resemble a candle to the from that turn on when removed from the recharging and support member. The luminaries may also turn on when power to the recharging and support member is turned off, turning the luminaries on automatically as during a power failure. The luminaries may each be inductively coupled to the recharging and support member, which enables to provide an aesthetically pleasing interface free of electrical contacts. Relative rotation of luminary cover and foot members may be used to controllably alter the characteristics of the illumination, such as dimming/brightening.

12 Claims, 26 Drawing Sheets

U.S. PATENT DOCUMENTS

| | | | |
|---|---|---|---|
| 3,885,211 | A | 5/1975 | Gutai |
| 3,876,986 | A | 8/1976 | Zabroski |
| 4,029,954 | A | 6/1977 | Moyer |
| 4,150,302 | A | 4/1979 | Roche |
| 4,177,500 | A | 12/1979 | Nicholl et al. |
| 4,214,185 | A | 7/1980 | Breeze |
| 4,223,232 | A | 9/1980 | Bulat |
| 4,244,011 | A | 1/1981 | Hammel et al. |
| 4,374,354 | A | 2/1983 | Petrovic et al. |
| 4,383,212 | A | 5/1983 | Ballman |
| 4,463,283 | A | 7/1984 | Penney et al. |
| 4,605,993 | A | 8/1986 | Zelina, Jr. |
| 4,647,831 | A | 3/1987 | O'Malley et al. |
| 4,716,352 | A | 12/1987 | Hurn et al. |
| 4,739,242 | A | 4/1988 | McCarty et al. |
| 4,754,376 | A | 6/1988 | Winslow |
| 4,764,853 | A | 8/1988 | Thomas et al. |
| 4,827,245 | A | 5/1989 | Lipman |
| 5,010,454 | A | 4/1991 | Hopper |
| 5,039,929 | A | 8/1991 | Veistroffer et al. |
| 5,055,986 | A | 10/1991 | Johnson |
| 5,124,532 | A | 6/1992 | Hafey et al. |
| 5,233,271 | A | 8/1993 | Huang |
| 5,365,145 | A | 11/1994 | Fields |
| 5,392,162 | A * | 2/1995 | Glucksman ................. 359/872 |
| 5,399,089 | A | 3/1995 | Eichman et al. |
| 5,426,347 | A | 6/1995 | Nilssen |
| 5,471,129 | A | 11/1995 | Mann |
| 5,473,517 | A | 12/1995 | Blackman |
| 5,535,108 | A | 7/1996 | Logsdon |
| 5,550,452 | A | 8/1996 | Shirai et al. |
| 5,558,429 | A | 9/1996 | Cain |
| 5,662,406 | A | 9/1997 | Mattice et al. |
| 5,734,229 | A | 3/1998 | Bavaro et al. |
| 5,748,080 | A | 5/1998 | Clay |
| 5,754,124 | A | 5/1998 | Daggett et al. |
| 5,801,513 | A | 9/1998 | Smith et al. |
| 5,900,715 | A | 5/1999 | Roberts |
| 5,908,233 | A | 6/1999 | Heskett et al. |
| 6,000,811 | A | 12/1999 | Bordak |
| 6,016,046 | A | 1/2000 | Kaite et al. |
| 6,034,505 | A | 3/2000 | Arthur et al. |
| 6,040,680 | A | 3/2000 | Toya et al. |
| 6,040,780 | A | 3/2000 | Lucas |
| 6,102,549 | A | 8/2000 | Thomas et al. |
| 6,107,744 | A | 8/2000 | Bavaro et al. |
| 6,179,438 | B1 | 1/2001 | Parker |
| 6,186,641 | B1 | 2/2001 | Parker |
| RE37,092 | E | 3/2001 | Sharrah et al. |
| 6,238,061 | B1 | 5/2001 | McKenzie |
| 6,243,276 | B1 | 6/2001 | Neumann |
| 6,268,027 | B1 | 7/2001 | Wu |
| 6,479,965 | B2 * | 11/2002 | Barbeau et al. ............. 320/115 |
| 6,536,917 | B1 | 3/2003 | Aperocho et al. |
| 6,554,445 | B1 | 4/2003 | Jacoby |
| 6,599,001 | B2 | 7/2003 | Johnson |
| 6,605,900 | B2 | 8/2003 | Chien |
| 6,633,152 | B2 | 10/2003 | Sharrah et al. |
| 6,634,768 | B2 | 10/2003 | McKenzie et al. |
| 6,652,115 | B2 | 11/2003 | Sharrah |
| 6,659,621 | B2 | 12/2003 | Sharrah et al. |
| D485,390 | S | 1/2004 | Stancik et al. |
| D486,787 | S | 2/2004 | Krieger et al. |
| D495,819 | S | 9/2004 | Krieger et al. |
| 6,819,080 | B2 | 11/2004 | Barbeau et al. |
| 6,851,820 | B2 | 2/2005 | Choi et al. |
| 6,900,595 | B2 | 5/2005 | Cojocary |
| 6,909,260 | B2 | 6/2005 | Parker |
| 6,911,917 | B2 | 6/2005 | Higgs |
| 6,945,664 | B1 | 9/2005 | Frieling et al. |
| 6,986,589 | B2 | 1/2006 | Evans et al. |
| 7,006,002 | B2 | 2/2006 | Shomali |
| 7,011,426 | B2 | 3/2006 | Gabor |
| 7,029,146 | B2 | 4/2006 | Kitchen |
| 7,071,625 | B2 | 7/2006 | Ceng et al. |
| 7,125,145 | B2 | 10/2006 | Gardner et al. |
| 2002/0064041 | A1 | 5/2002 | Parker |
| 2003/0090892 | A1 | 5/2003 | Su |
| 2003/0141819 | A1 | 7/2003 | Cojocary |
| 2003/0142501 | A1 | 7/2003 | Exilien |
| 2004/0037069 | A1 * | 2/2004 | Blackbourn ................. 362/161 |
| 2004/0160769 | A1 | 8/2004 | Currie et al. |
| 2004/0184273 | A1 | 9/2004 | Reynolds et al. |
| 2004/0252492 | A1 | 12/2004 | Peterson |
| 2005/0194930 | A1 | 9/2005 | Barbeau et al. |
| 2005/0196716 | A1 | 9/2005 | Haab et al. |
| 2005/0239007 | A1 | 10/2005 | Dell'Aquila et al. |
| 2005/0264261 | A1 | 12/2005 | Barbeau et al. |
| 2005/0284856 | A1 | 12/2005 | Cafaro et al. |
| 2006/0034078 | A1 | 2/2006 | Kovacik et al. |
| 2006/0062019 | A1 | 3/2006 | Young |
| 2006/0072306 | A1 | 4/2006 | Woodyard |
| 2006/0082988 | A1 | 4/2006 | Riblett et al. |
| 2006/0103543 | A1 | 5/2006 | Chen et al. |
| 2006/0120069 | A1 | 6/2006 | West |
| 2006/0133089 | A1 | 6/2006 | Reid et al. |
| 2006/0139927 | A1 | 6/2006 | Kovacik et al. |
| 2006/0171143 | A1 | 8/2006 | Yuen |

FOREIGN PATENT DOCUMENTS

| | | |
|---|---|---|
| DE | 4113442 | 10/1992 |
| DE | 4220148 | 12/1993 |
| GB | 2278428 | 11/1994 |
| JP | 05168175 | 2/1993 |

* cited by examiner

AUTOILLUMINATING RECHARGEABLE LAMP SYSTEM

CROSS-REFERENCE TO RELATED APPLICATIONS

The present invention is a continuation-in-part (CIP) of non-provisional U.S. utility application Ser. No. 11/161,689, filed Aug. 12, 2005, which is a continuation-in-part (CIP) of non-provisional U.S. utility application Ser. No. 10/989,199, filed Nov. 15, 2004, which is a CIP of U.S. utility patent application Ser. No. 10/292,007 filed Nov. 09, 2002, now U.S. Pat. No. 6,819,080, which is a CIP of U.S. utility patent application Ser. No. 09/885,848, filed Jun. 20, 2001, now U.S. Pat. No. 6,479,965, each of which is incorporated herein by reference.

FIELD OF THE INVENTION

The present invention is drawn to the field of illumination, and more particularly, to a novel rechargeable lamp system.

BACKGROUND OF THE INVENTION

Candles may be moved and placed to provide illumination and/or ambience. While their utilitarian and aesthetic advantages are well-known, candles suffer from an undesirable self-consumption, needing to be replaced when used-up; produce smoke especially when snuffed, which may foul the air; require vigilant attendance to mitigate an ever-present fire hazard; are susceptible to being extinguished by gusts of air when used outdoors or moved around; and may give rise to undesirable wax build-up, which in many instances needs removed from candle support members or underlying structures. Moreover, the more lumens that are desired for a particular setting, the greater is the number of candles that need to be deployed, further magnifying the risks and other disadvantages of candle use.

There is thus a need to provide a rechargeable lamp system that enjoys the many utilitarian and aesthetic advantages of candles but is not subject to their disadvantages.

SUMMARY OF THE INVENTION

It is accordingly a general object of the present invention to disclose a rechargeable lamp system that provides candle-like lighting for indoor or outdoor use that avoids the problems associated with candles.

In accordance therewith, the autoilluminating rechargeable lamp system of the present invention includes a recharging platter adapted to receive a set of luminaries including a first circuit coupled to each luminary of said set of luminaries received thereon operative in response to supplied AC power to provide a charge signal to each luminary of said set of luminaries received thereon; and a set of luminaries each having a light emitting element connected to a rechargeable battery pack via a second circuit operative in one mode to charge said rechargeable battery pack in response to said charge signal when each luminary of said set of luminaries is received on said recharging platter and operative in another mode to activate said light emitting element in response to the absence of said signal, whereby, each said luminary lights if removed from said recharging platter and lights if no AC power is supplied to said recharging platter when received therein.

In the presently preferred embodiments, the set of luminaries includes one or more luminaries each of which is inductively coupled to the first circuit of the recharging platter. The inductive coupling provides automatic, hands-free recharging of the rechargeable battery pack of a luminary upon its receipt by the recharging platter, and provides automatic, hands-free actuation of a luminary when it is removed therefrom.

In the presently preferred embodiments, each luminary of the set of luminaries is self-standing and includes a diffusor that may be shaped to resemble a candle releasably mounted to a base member supporting said light emitting element therewithin.

In further accordance therewith, the autoilluminating rechargeable lamp system of the present invention includes a wall mountable charging base adapted to support a set of luminaries including a first circuit coupled to each luminary of said set of luminaries supported thereon operative in response to supplied AC power to provide a charge signal to each luminary of said set of luminaries supported thereon; and a set of luminaries each having a light emitting element connected to a rechargeable battery pack via a second circuit operative in one mode to charge said rechargeable battery pack in response to said charge signal when each luminary of said set of luminaries is supported thereon and operative in another mode to activate said light emitting element in response to the absence of said signal, whereby, each said luminary lights if removed from said wall mountable charging base and lights if no AC power is supplied to said wall mountable charging base when supported thereon.

In the presently preferred embodiments, the wall mountable charging base may be plugged directly into an AC wall outlet and/or mounted adjacent an AC wall outlet by any suitable mounting hardware.

In further accordance therewith, the autoilluminating rechargeable lamp system of the present invention includes a charging base adapted to support a set of luminaries including a first circuit coupled to each luminary of said set of luminaries supported thereon operative in response to supplied AC power to provide a charge signal to each luminary of said set of luminaries supported thereon; a sensor to provide a seat signal representative that each luminary of said set of luminaries is supported on said charging base; and a set of luminaries each having a light emitting element connected to a rechargeable battery pack via a second circuit operative in one mode to charge said rechargeable battery pack in response to said charge signal when each luminary of said set of luminaries is supported thereon and operative in another mode to activate said light emitting element in response to the absence of said seat signal, whereby, each said luminary lights if removed from said charging base and does not light if no AC power is supplied to said charging base when supported thereon.

In the presently preferred embodiments, the charging base may be provided with a removable cover that protects the luminaries during charging, storage, and a handle that aids in transit.

In further accordance therewith, the autoilluminating rechargeable lamp system of the present invention includes a charger member adapted to be supported by a surface and further adapted to receive a set of luminaries such that each luminary of the set of luminaries is supported on said support and in such a way that the charger at least partially surrounds a part of each luminary of the set of luminaries including a first circuit coupled to each luminary of said set of luminaries received thereby operative in response to supplied AC power to provide a charge signal to each luminary of said set of luminaries received thereby; and a set of luminaries each having a light emitting element connected to a rechargeable battery pack via a second circuit operative in one mode to charge said rechargeable battery pack and to de-light said light emitting element in response to detection of said charge signal when each luminary of said set of luminaries is received thereby and operative in another mode to activate said light emitting element in response to the absence of said signal, whereby, each said luminary lights if removed from said charger and de-lights when received thereby. The charger and luminaries are relatively movable so that the charger may be removed from the set of luminaries while remaining on the support causing each luminary to light.

In one presently preferred embodiment, each luminary of the set of luminaries includes a diffusor releasably mounted to a base. A light support carried by the base allows replacement of the light emitting element and a rechargeable battery compartment carried by the base allows replacement of the rechargeable battery. In the presently preferred embodiments, the light support and battery compartment are adapted to allow manual light element and rechargeable battery replacement, and the diffusor is manually releasably mounted to the base, although light mechanical action could be employed to provide ease of light element and rechargeable battery replacement without departing from the inventive concepts. Multiple light emitting elements and corresponding supports may be provided for light animation effects.

In further accordance therewith, the autoilluminating rechargeable lamp system of the present invention includes a charger module adapted to receive the bottom end of a lantern module, including a first circuit coupled to said received bottom end operative in response to supplied AC power to provide a charge signal to the lantern module received thereby; and a lantern module rotatable about its axis of extension having a bottom end that is received by said charger module including at least one light emitting element connected to a rechargeable battery pack via a second circuit operative in one mode to charge said rechargeable battery pack and to de-light said at least one light emitting element in response to receipt of the lantern module on the charger module and to activate said at least one light emitting element in response to removal of the lantern module from said charger module and operative in another mode to controllably alter the light emitting characteristics of the at least one light emitting element in response to rotation of the lantern module about its axis of rotation.

In one presently preferred embodiment of the autoilluminating rechargeable lamp in accord with the present invention, the second circuit in said other mode controllably dims/increases the intensity of the at least one light emitting element in response to rotation of the lantern module about its axis of extension both when it is received by and when it is removed from the charger module. The lantern module includes a bulbous translucent cover inside which an array of comparatively bright white LED's powered by a 1.2 v NiMH rechargeable battery pack provides from 6-10 hours of illumination depending on the intensity selected. Both the LED array and battery pack are replaceable. A handle at the top end of the lantern module provides easy portability.

BRIEF DESCRIPTION OF THE DRAWINGS

These and other objects, advantageous features and inventive aspects of the present invention will be more fully appreciated as the same becomes better understood from the following detailed description of the preferred embodiments when considered in connection with the accompanying drawings, in which.

DETAILED DESCRIPTION OF THE PREFERRED EMBODIMENTS

Figure 1:
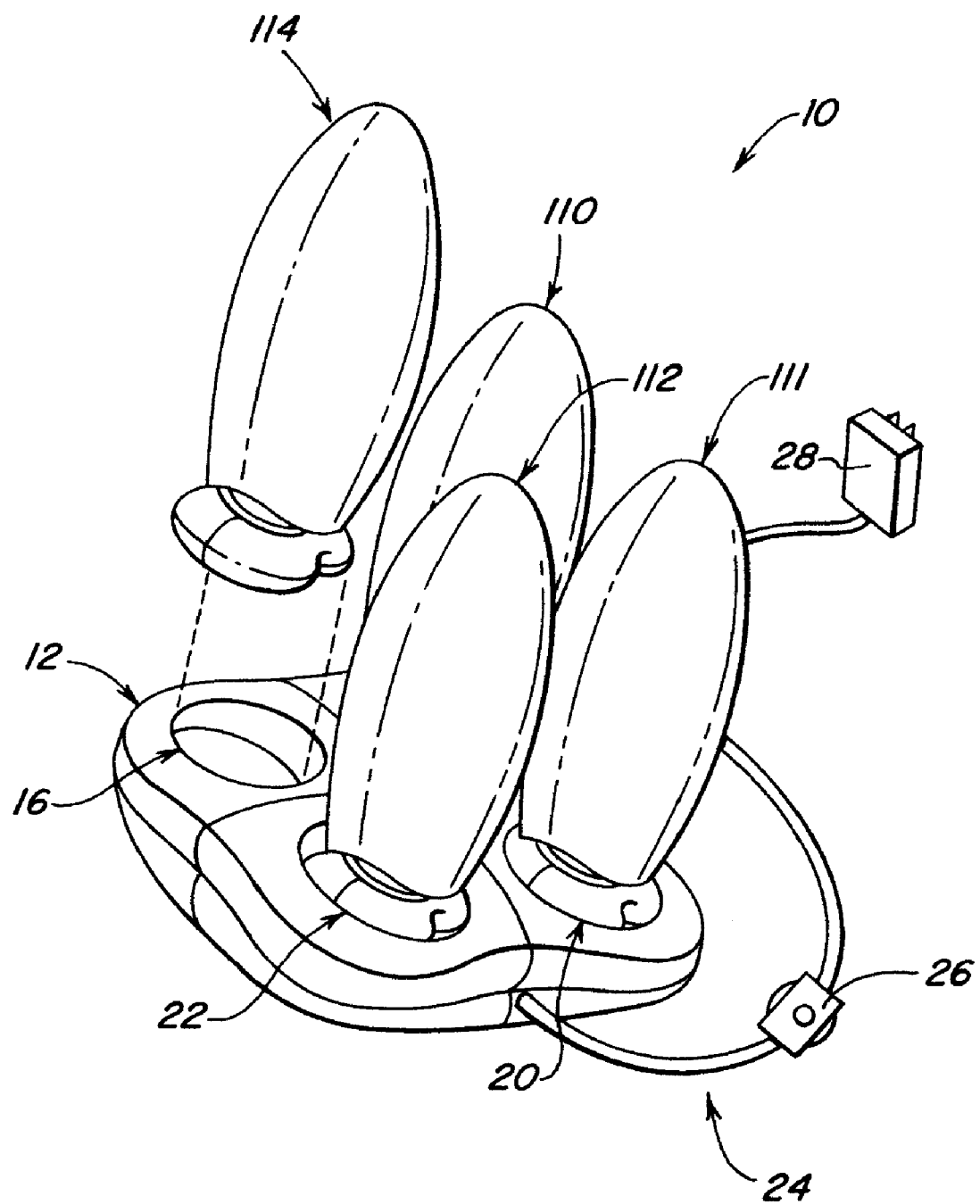
FIG. 1 is a perspective view of an exemplary embodiment of the present invention, showing a charging stand and one lamp module.

Referring now to FIG. 1, reference numeral 10 generally refers to the rechargeable lamp system of the present invention. Lamp system 10 comprises a charging stand 12 and a plurality of lamp modules 110, 111, 112 and 114.

Figure 2:
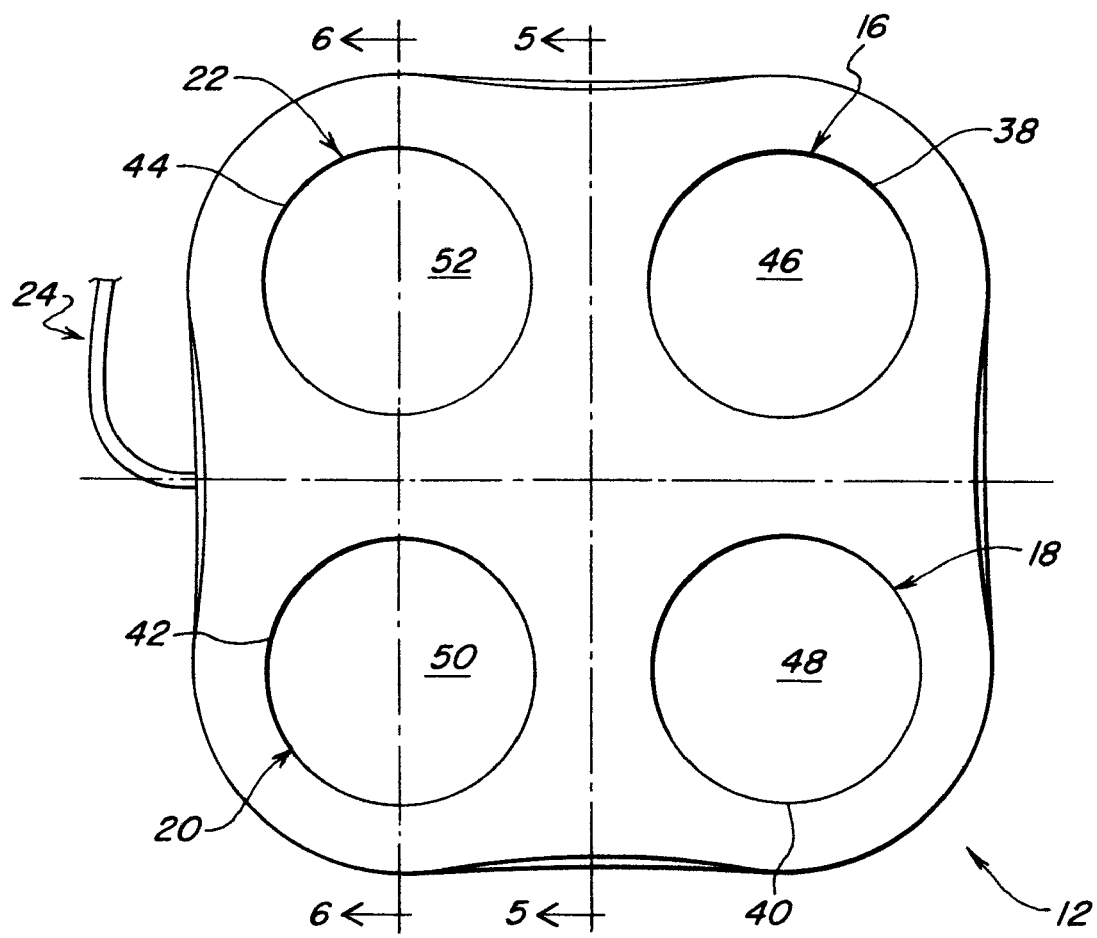
FIG. 2 is a top view of the charging stand.

As shown in FIGS. 1 and 2, stand 12 comprises slots 16, 18, 20 and 22 which are each adapted to removably receive one of said lamp modules 110, 111, 112 and 114. Slots 16, 18, 20 and 22 each include a respective cylindrical wall 38, 40, 42, and 44 and a substantially planar floor 46, 48, 50 and 52.

A power cord 24 having an inline power switch 26 and a "wall-block" style transformer provides power to charging stand 12 via ordinary 120-volt household current. In alternate embodiments, the transformer may be dispensed with.

As will be described in greater detail herein, each of modules 110, 111, 112 and 114 is battery-powered and designed to be charged by magnetic induction when placed in a respective one of slots 16, 18, 20 and 22. Modules 110, 111, 112 and 114 are each designed to illuminate when removed from slots 16, 18, 20 and 22, or when AC power is cut off to charging stand 12.

The number of lamp modules (and a corresponding slot for each module) shown in the preferred embodiment is intended to be merely exemplary. It should be understood that the lamp system 10 of the present invention may be constructed with any number of modules.

Figure 3:
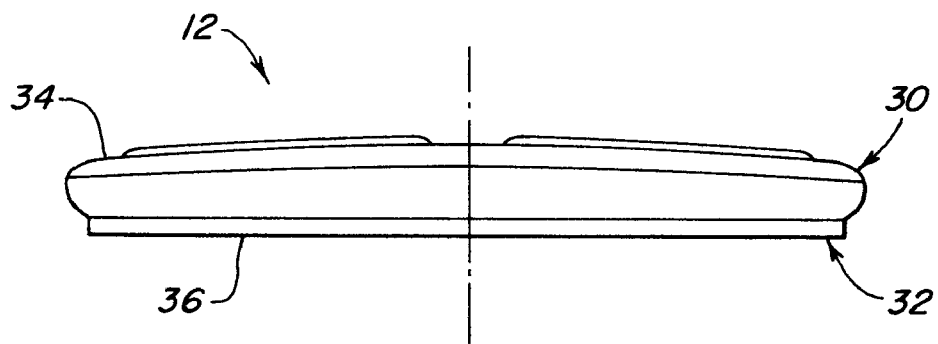
FIG. 3 is a front view of the charging stand.
Figure 4:
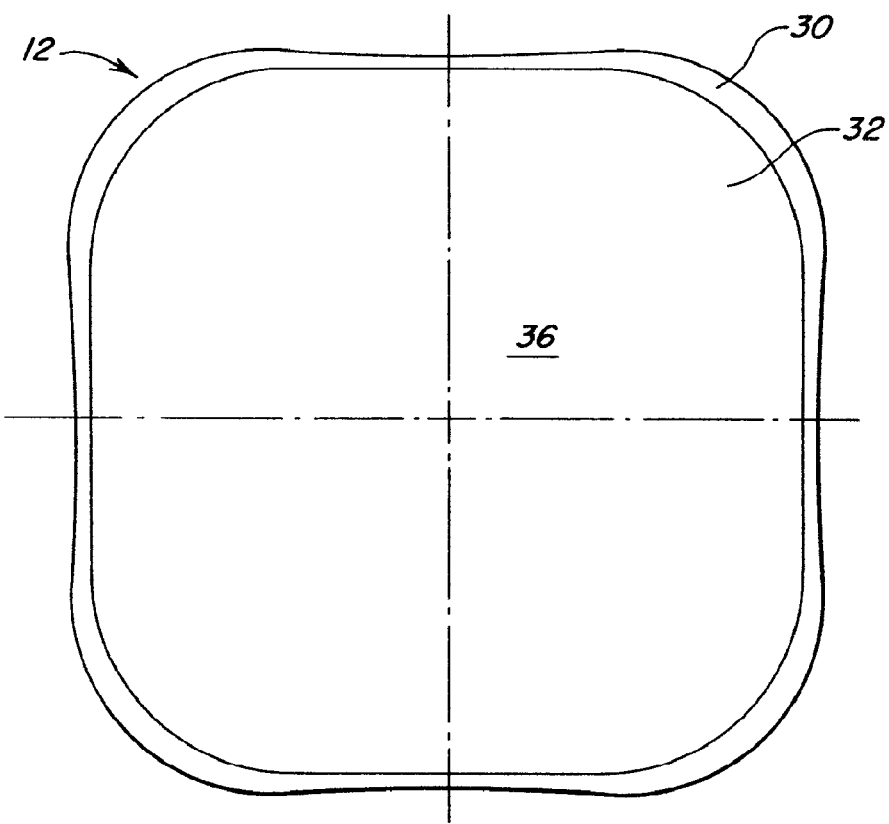
FIG. 4 is a bottom view of the charging stand.

Referring now to FIGS. 3-4, stand 12 also includes an upper portion 30 and a lower portion 32. In an exemplary embodiment, upper portion 30 is ceramic. However, upper portion 30 may be made from other suitable materials, such as wood or plastic. In the interest of economy, lower portion 32 in the exemplary embodiment is formed of injection-molded plastic, but may as well be made of other suitable materials, such as steel or other metal or other material. In the exemplary embodiment, upper portion 30 and lower portion 32 snap together. However, any suitable means, such as bonding, screws, etc. could be used to secure upper portion 30 and lower portion 32.

Figure 5:
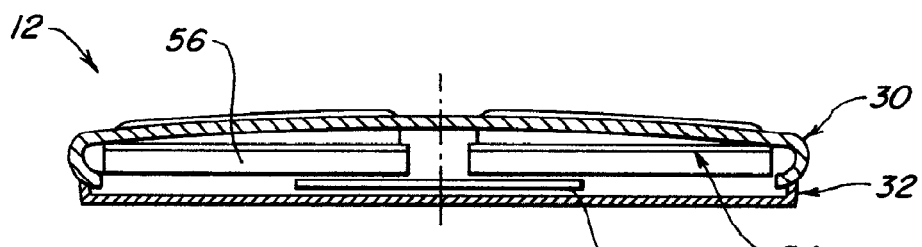
FIG. 5 is a sectional view of the charging stand, taken along line 5-5 of FIG. 2.
Figure 6:
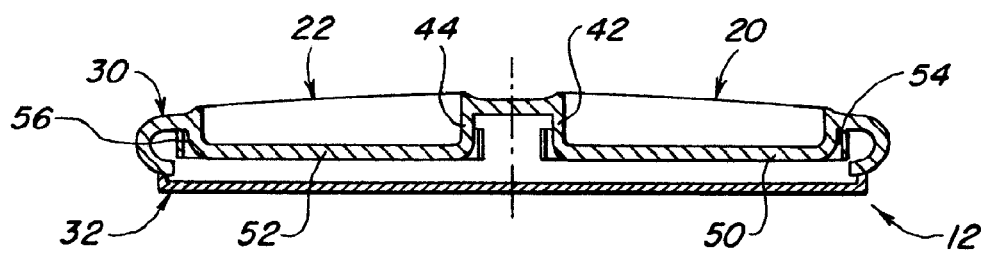
FIG. 6 is a sectional view of the charging stand, taken along line 6-6 of FIG. 2.

As shown in FIGS. 2, 5 and 6, stand 12 further includes a circuit board 58 which is hardwired to cord 24 and four primary induction coils (wired in parallel), one coil encircling each of walls 38, 40, 42 and 44, respectively. FIG. 5 shows a pair of primary induction coils 54 and 56 that encircle walls 44 and 42, respectively. Identical primary coils (not shown) encircle walls 38 and 40.

Figure 7:
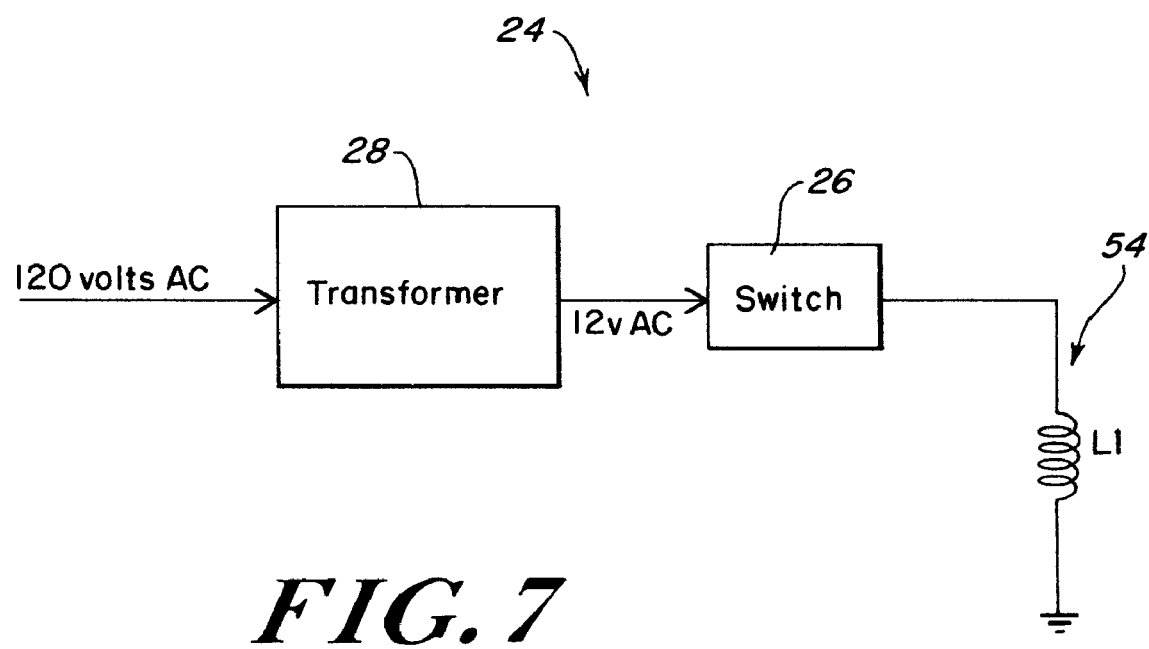
FIG. 7 is a circuit diagram of the charging stand circuit.
Figure 8:
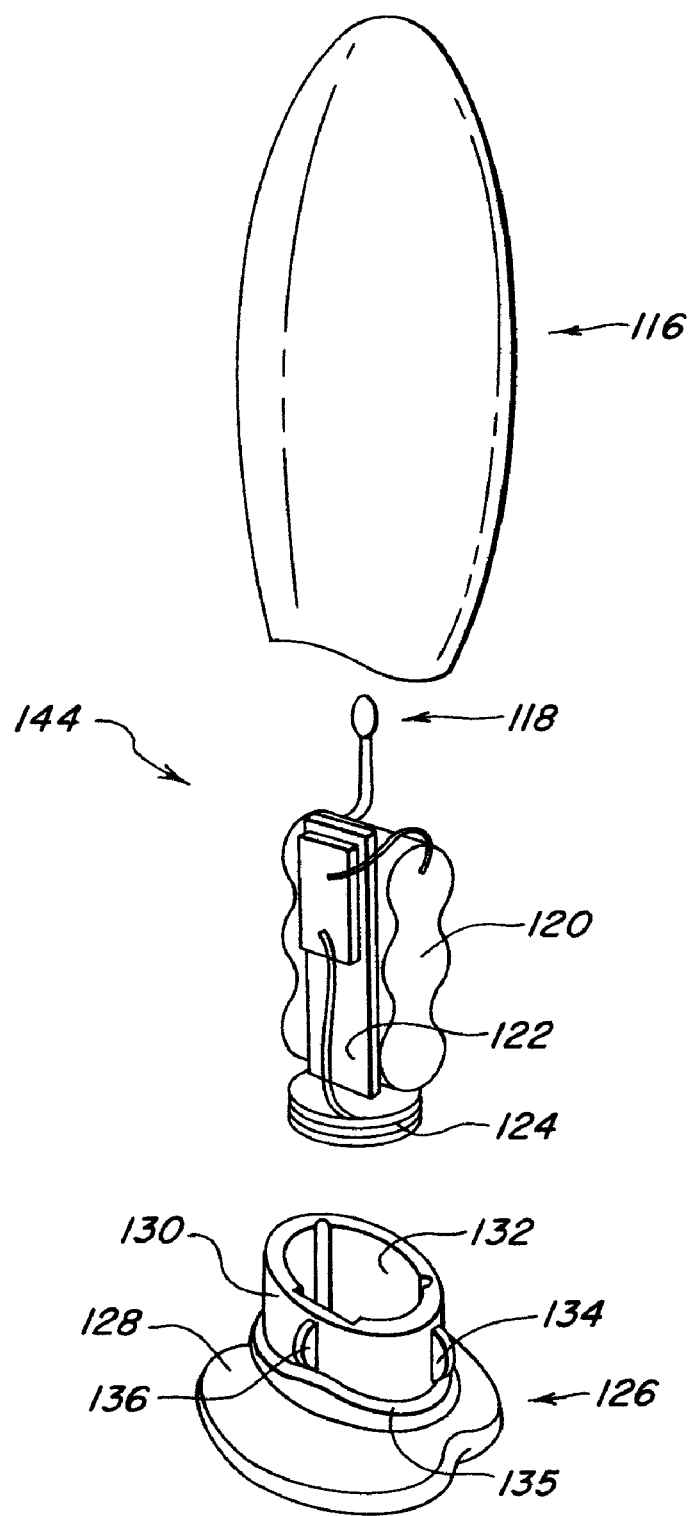
FIG. 8 is an exploded perspective view of an exemplary embodiment of a lamp module according to the present invention.
Figure 11:
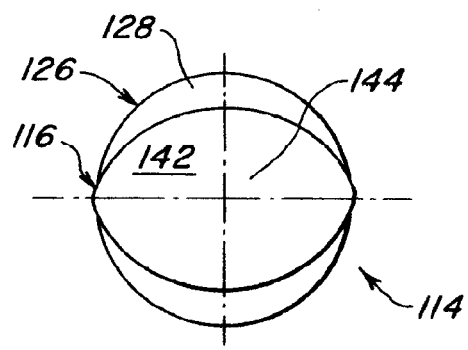
FIG. 11 is a top view of the lamp module.
Figure 10:
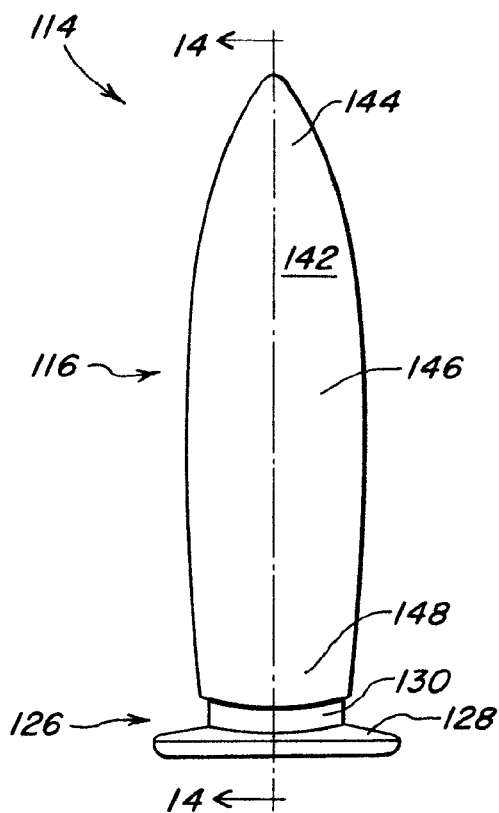
FIG. 10 is a right side view of the lamp module.
Figure 9:
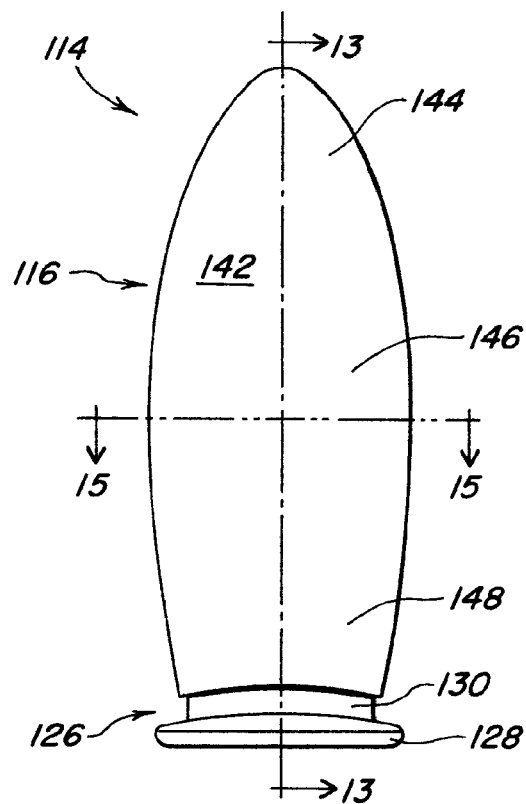
FIG. 9 is a front view of the lamp module.
Figure 12:
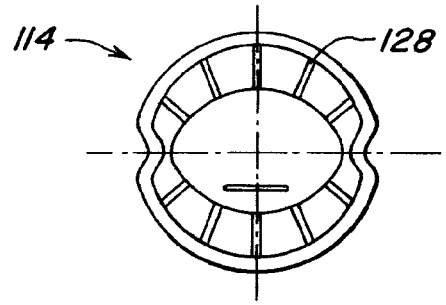
FIG. 12 is a bottom view of the lamp module.
Figure 15:
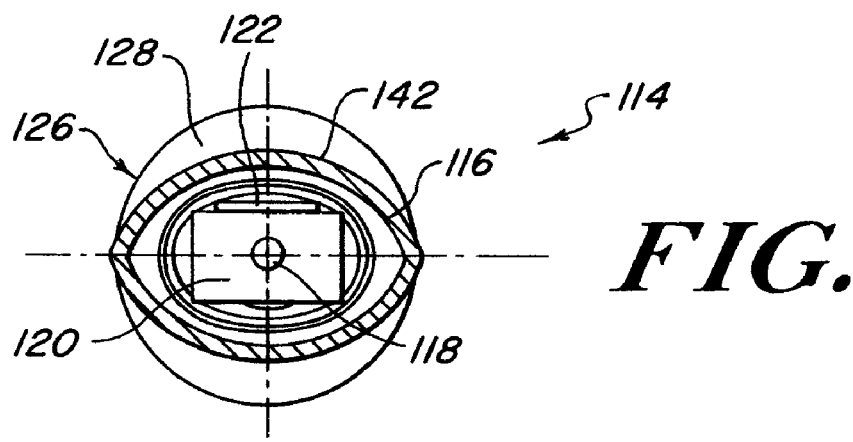
FIG. 15 is a sectional view of the lamp module taken along line 15-15 of FIG. 9.

FIG. 7 shows the circuit formed by transformer 28, inline power switch 26, and primary induction coil 54. As shown in FIG. 7, transformer 28 converts 120 volts AC to 12 volts AC. The three other primary induction coils, not shown, are preferably wired in parallel with primary induction coil 54. In other embodiments, the transformer component can be replaced by the inductor coils (on the platter and luminaries), whose turn-ratios are selected to provide a stepped-down voltage to the lamps. As will be appreciated by those of skill in the art, an oscillator providing frequencies higher than line frequency may be employed to improve efficiency (inductor size and attendant cost).

Modules 110, 111 and 112 are identical to module 114. Thus, it will only be necessary to describe module 114 in detail.

As shown in FIGS. 8-16, module 114 comprises a diffuser 116, a light bulb 118, a battery pack 120, a circuit board 122, a secondary induction coil 124 and a base 126.

Diffuser 116 in the exemplary embodiment is formed of blow-molded plastic (or glass) having a frosted outer surface 142. It could also be injection-molded plastic with a frosted, translucent finish. In the exemplary embodiment, diffuser 116 is slender and elongated in shape and includes a mid-section 146 that tapers upwardly to a tip 144 and tapers slightly to a tail 148. This shape is chosen to provide optimal light color and transmission, as well as even diffusion of light from bulb 118. Obviously, numerous alternative shapes for diffuser 116 are possible. However, the internal volume created by diffuser 116 must be sufficient to envelop bulb 118, battery pack 120 and circuit board 122. In addition, because of the heat generated by bulb 118, it is desirable to provide air space between bulb 118 and diffuser 116 to prevent diffuser 118 from melting or deforming.

Base 126 comprises a lower portion 128 that provides stable support for module 114 when placed on a level surface or within slot 16. Neck 130 is adapted to removably receive diffuser 116 (to enable access to bulb 118 and battery pack 120). Neck 130 includes tabs 134, 136, 138 and 140 and a lip 135 that cooperate to secure tail 148 of module 114 to neck 130 (see FIGS. 8, 13 and 14).

Battery pack 120 in the exemplary embodiment comprises three "AA" Nickel-Cadmium (Ni-Cad) cells wrapped in PVC shrink-wrap and having a total output of 3.6 Vdc and 500-800 mA. Of course, other types and sizes of rechargeable cells, such as Nickel-Metal-Hydride or Lithium cells, could be substituted for the Ni-Cad cells. Such cells would provide more power, and charge more quickly than Ni-Cads, but are substantially more expensive.

The power requirements for bulb 118 are, of course, chosen to match the power output of battery pack 120. In the exemplary embodiment, bulb 118 is a conventional miniature incandescent bulb, such as Chicago Miniature Lamp, Inc. part # CM1738, having an output of 1 candela and having design power requirements of 2.80V and 60 mA and an expected life of 6,000 hours. Of course, other lamps and types of light sources, such as a light-emitting diode (L.E.D.) may be substituted for bulb 118. The incandescent bulb shown is preferred because of its balance of cost, heat generation, power consumption, expected service life and brightness characteristics.

Figure 14:
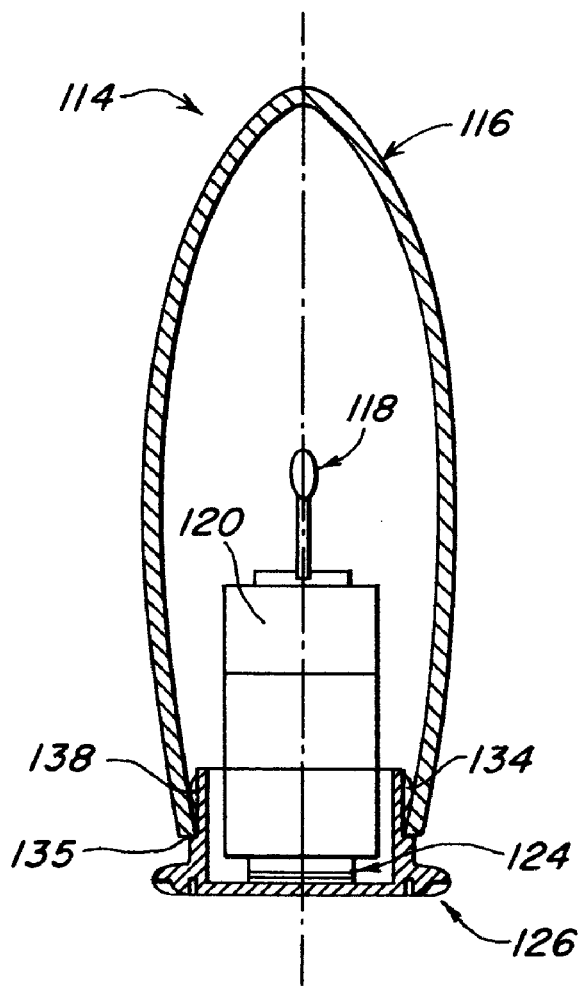
FIG. 14 is a sectional view of the lamp module taken along line 14-14 of FIG. 10.
Figure 13:
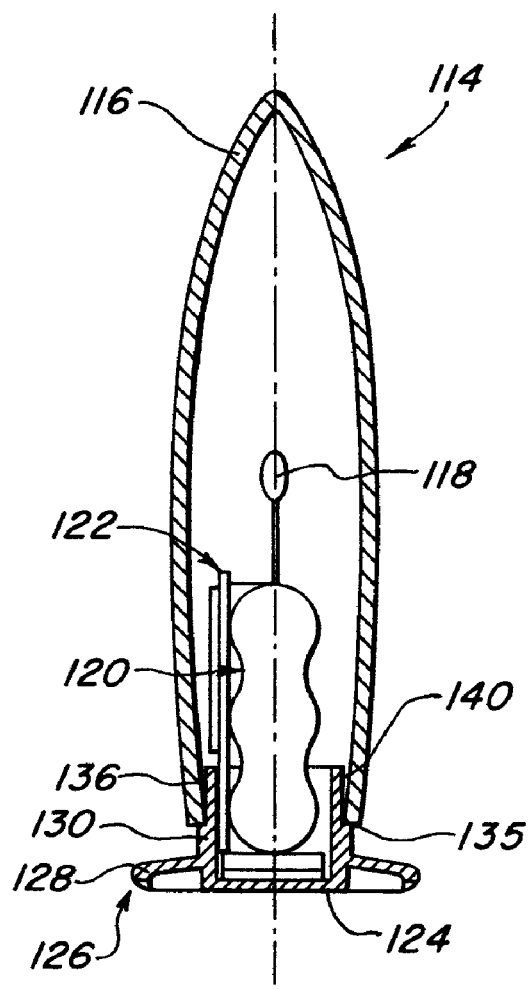
FIG. 13 is a sectional view of the lamp module taken along line 13-13 of FIG. 9.
Figure 16:
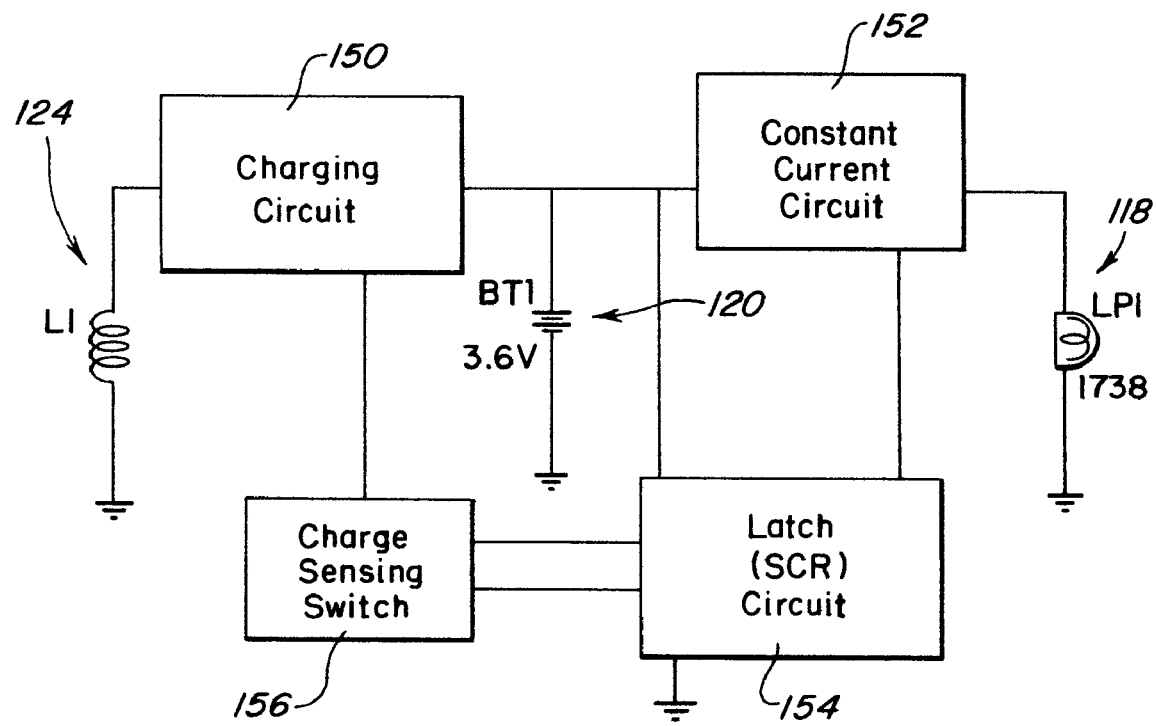
FIG. 16 is an exemplary embodiment of a circuit diagram of the lamp module circuit board according to the present invention.

As shown in FIGS. 13 and 14, bulb 118 and battery pack 120 are preferably hard-wired to circuit board 122. As shown in FIG. 16, circuit board 122 comprises four primary circuits that control the charging of battery pack 120 and the lighting of bulb 118.

A charging circuit 150 regulates the voltage and current flowing to battery pack 120 from secondary induction coil 124 to prevent damage to battery pack 120. A latch circuit 154 cuts off current to bulb 118 when the voltage output of battery pack 120 drops below 3.1 volts, thus preventing damage to battery pack 120 which could be caused by fully draining battery pack 120. A charge-sensing switch 156 works in cooperation with latch circuit 154 to turn off current to bulb 118 when current is detected in charging circuit 150. A constant current source circuit 152 provides a constant flow of current (65 mA in the exemplary embodiment) to bulb 118. This enables bulb 118 to shine at a constant brightness despite fluctuations in the output current from battery pack 120. In alternate embodiments, a constant voltage source could be employed.

As described above, battery pack 120 is charged by magnetic induction. The magnetic field created by primary induction coil 54 (when current is applied) induces a current in secondary induction coil 124 when secondary induction coil 124 is concentrically located relative to primary induction coil 54. In the present invention, this occurs when module 114 is placed within slot 16 (see FIG. 1).

It is preferable to ship battery pack 120 fully charged, as this will increase the shelf life of the Ni-Cad cells. However, shipping battery pack 120 fully charged requires the inclusion of means for electrically isolating battery pack 120 from lamp 118 between the time battery pack 120 is charged and when module 114 is first used by an end consumer. Such means could comprise a Mylar tab (not shown) inserted between two electrical contacts after the initial charging which would be removed by the consumer before first use. Alternatively, such means could comprise a fusible link (not shown). The fusible link would be adapted to close current regulating circuit 152 when current is sensed in charging circuit 150 (i.e., the first time the consumer plugs in charging stand 12).

Operation of lamp system 10 is elegantly straightforward. As described above, bulb 118 is designed to illuminate when no current is sensed in charging circuit 150. Thus, bulb 118 will automatically turn on when module 114 is removed from slot 16. Charging stand 12 and module 114 can also function as a table lamp by leaving module 114 in slot 16 and switching off inline power switch 26. Module 114 also functions as an emergency light—automatically turning on during a power failure.

Figure 17:
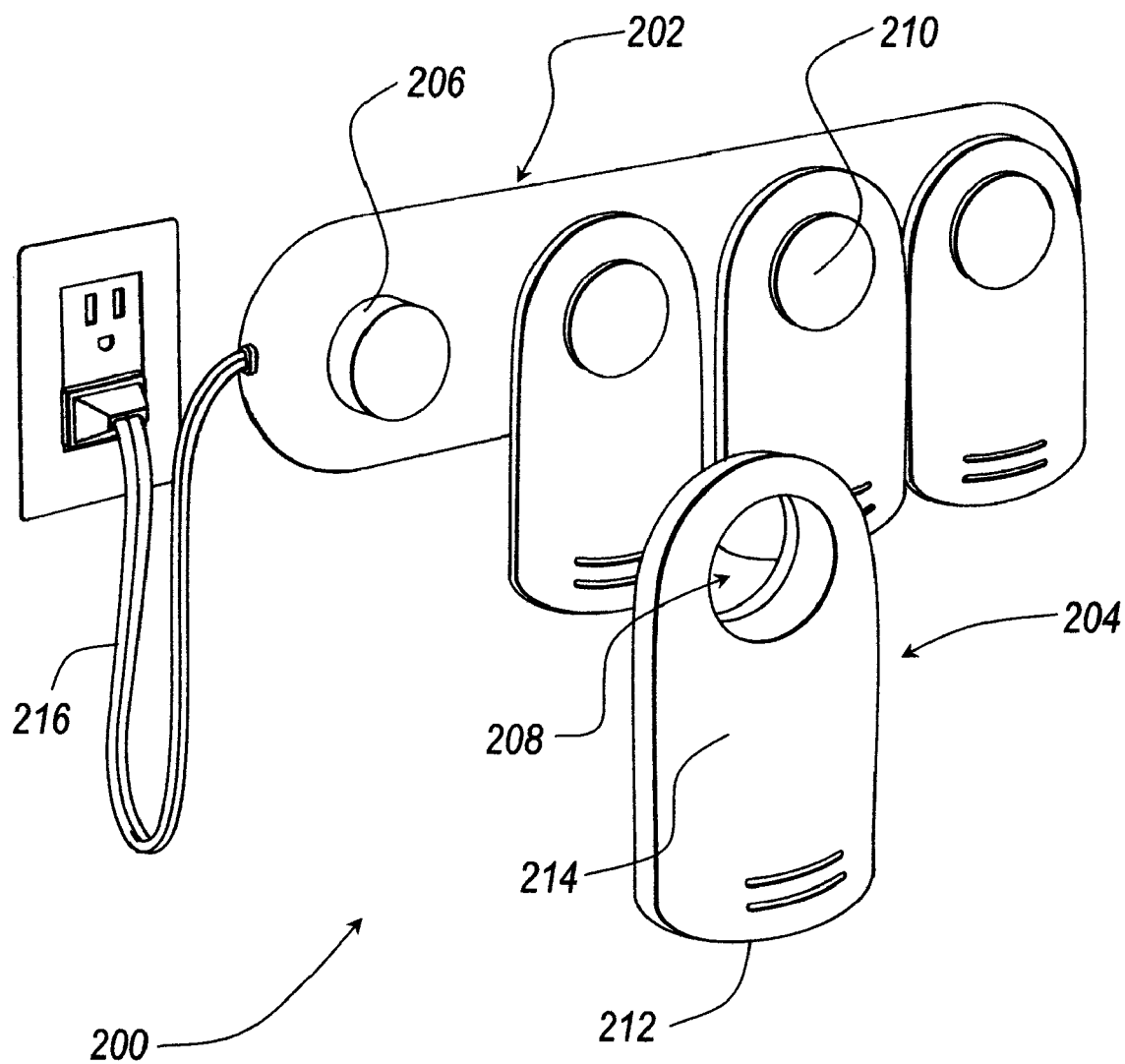
FIG. 17 is a pictorial view of another exemplary embodiment of the present invention, showing a wall mountable charging base and four lamp modules.

Referring now to FIG. 17, reference numeral 200 generally refers to another exemplary embodiment of the rechargeable lamp system of the present invention. Lamp system 200 comprises a wall mountable charging base generally designated 202 and four lamp modules generally designated 204. The number of lamp modules shown in the preferred embodiment is intended to be merely exemplary. It should be understood that the lamp system 200 of the present invention may be constructed with any number of modules.

As shown, the wall mountable charging base 202 comprises projections 206 spaced laterally apart a distance larger than the width of each lamp module 204, and each lamp module 204 comprises an opening therethrough generally designated 208 adjacent to its top surface. The projections 206 cooperate with the openings 208 to removably support the lamp modules 204 on the wall mountable charging base 202. Projections 206 and openings 208 are each of generally cylindrical geometry, although projections and openings of another geometry or other removable supporting means may be employed without departing from the inventive concepts.

Each projection has a free end, and a diffuser 210 is removably or fixedly mounted to the free end over an LED and ambient light sensor mounted thereon not shown, that switches the LED "on" in response to a condition of ambient darkness, Each lamp module 204 has a flat base 212 and a front face diffuser 214 that extends from top to bottom and surrounds the opening 208. The flat base 212 enables to place each lamp module 204 on a shelf or table and the opening 208 allows it to be carried about or hung on a hook to provide illumination in a wide variety of situations.

A power cord 216 having an inline power switch, not shown, provides power to wall mountable charging base 202 via ordinary 120-volt household current. The base 202 may be wall mounted over or spaced in relation to the AC wall outlet by any suitable mounting means, and a recess and/or power cord wrap or other means may be employed to stow any excess cord within the wall mountable charging base 202. In alternate embodiments, the power switch may be dispensed with.

As in the embodiment described above in connection with the description of the FIGS. 1-16, each lamp module 204 is designed to be charged by magnetic induction. Inductive magnetic coupling is provided by primary and secondary coils, not shown, carried on the projections 206 of the charging base and about the openings 208 of the lamp modules 204 when supported by a respective one of the projections 206. Other coupling means such as mating electrical contacts or other means could be employed without departing from the inventive concepts, As in the embodiment described above in connection with the description of the FIGS. 1-16, modules 204 are each designed to illuminate when removed from projections 206, or when AC power is cut off to wall mountable charging base 202, The wall mountable recharging base includes a first charge circuit responsive to supplied AC power to provide a charge signal and each lamp module includes a light emitting element connected to a rechargeable battery pack via a second circuit operative in one mode to charge the rechargeable battery pack in response to the charge signal when each lamp module is supported by the wall mountable charging base and operative in another mode to activate the light emitting element in response to the absence of the charge signal, whereby, each lamp module lights if removed from the wall mountable recharging base and lights if no AC power is supplied to the wall mountable recharging base when supported thereon.

A switch, not shown, may be provided to independently turn each lamp module 204 on/off to conserve charge or to use the light as needed.

Figure 18:
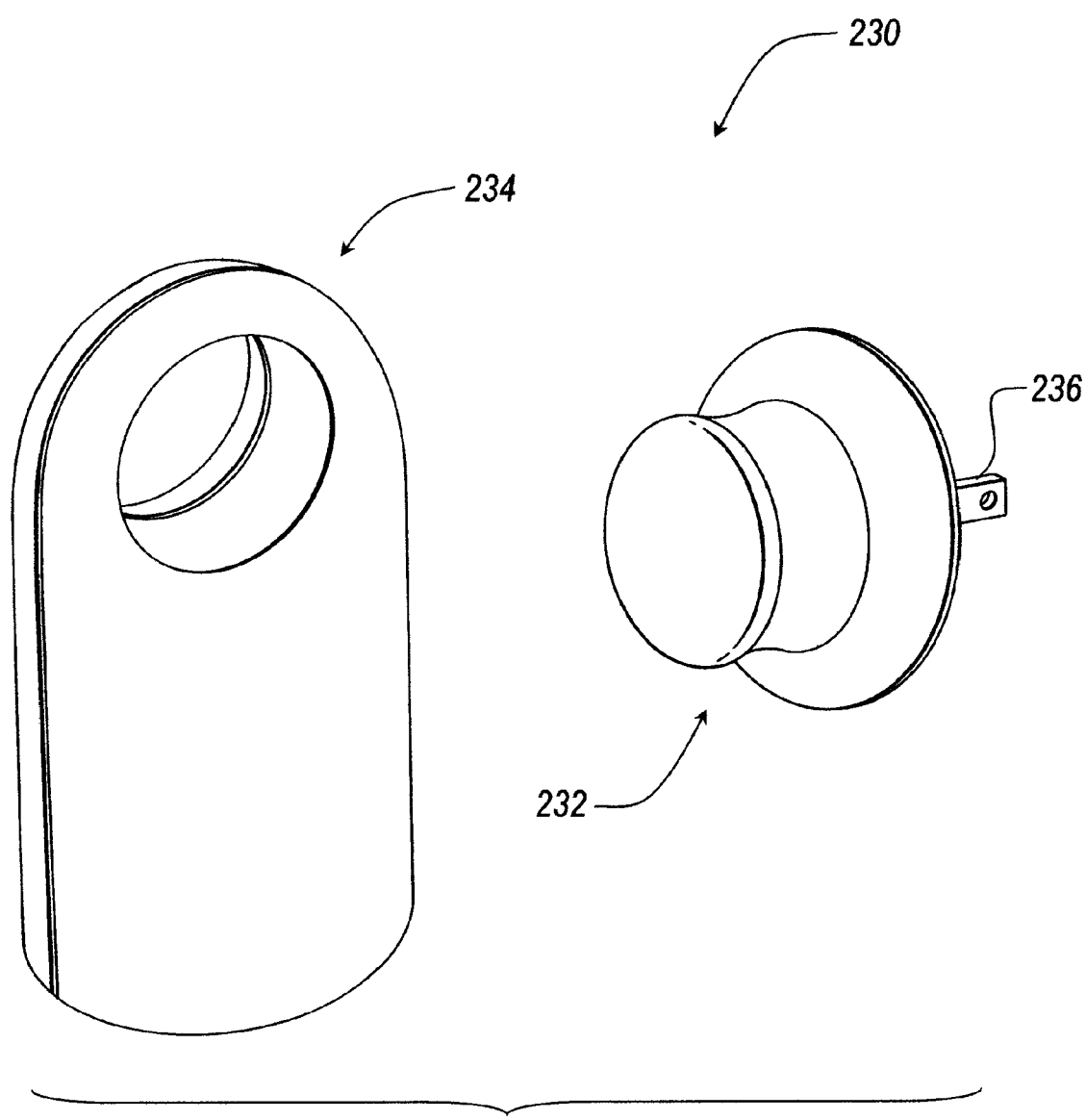
FIG. 18 is a pictorial view of another exemplary embodiment of the present invention, showing a wall plug mountable charging base and single lamp modules.

Referring now to FIG. 18, reference numeral 230 generally refers to another exemplary embodiment of the rechargeable lamp system of the present invention. Lamp system 230 comprises a wall plug mountable charging base generally designated 232 and a single lamp module generally designated 234. The embodiment 230 is generally the same as the embodiment 200 described above in connection with the description of FIG. 17, except the wall plug mountable charging base 232 includes extending plug members 236 adapted to plug the base directly into a standard AC wall outlet.

Figure 19:
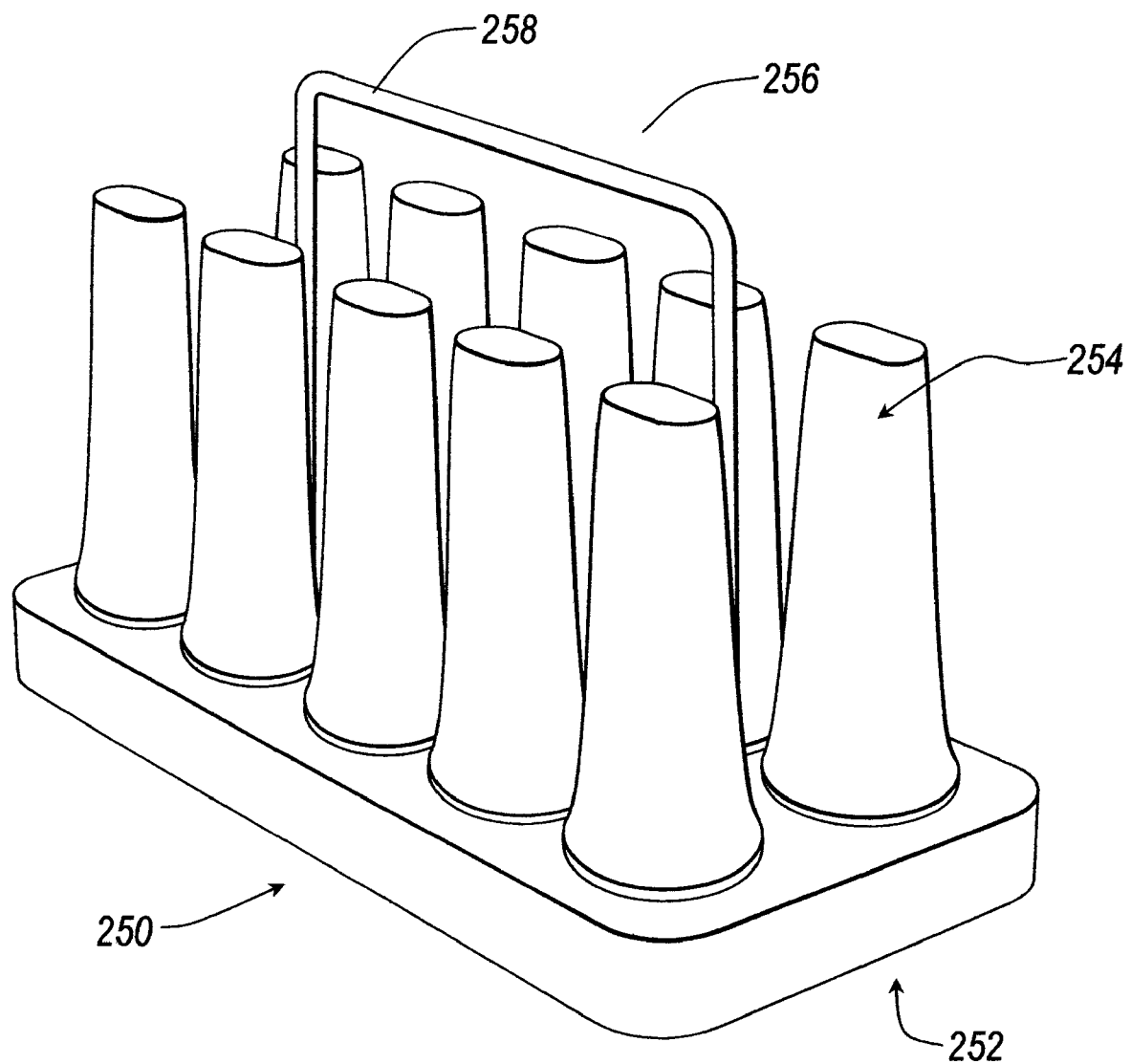
FIG. 19 is a pictorial view of another exemplary embodiment of the present invention, showing a carrier/charging base and eight lamp modules.

Referring now to FIG. 19, reference numeral 250 generally refers to another exemplary embodiment of the rechargeable lamp system of the present invention. Lamp system 250 comprises a carrier/charging base generally designated 252 and ten lamp modules generally designated 254. A cover 256, preferably translucent, is removably mounted by any suitable means to the carrier/charging base 252 and a handle member 258, preferably of aluminum but which could be of other metal or material, is attached by any suitable means to be carrier/charging base 252. The cover member 256 protects the lamp modules during charging, storage and transit, and the handle member 258 provides for ease of transport. The number of lamp modules shown in the preferred embodiment is intended to be merely exemplary. It should be understood that the lamp system 250 of the present invention may be constructed with any number of modules.

Figure 20:
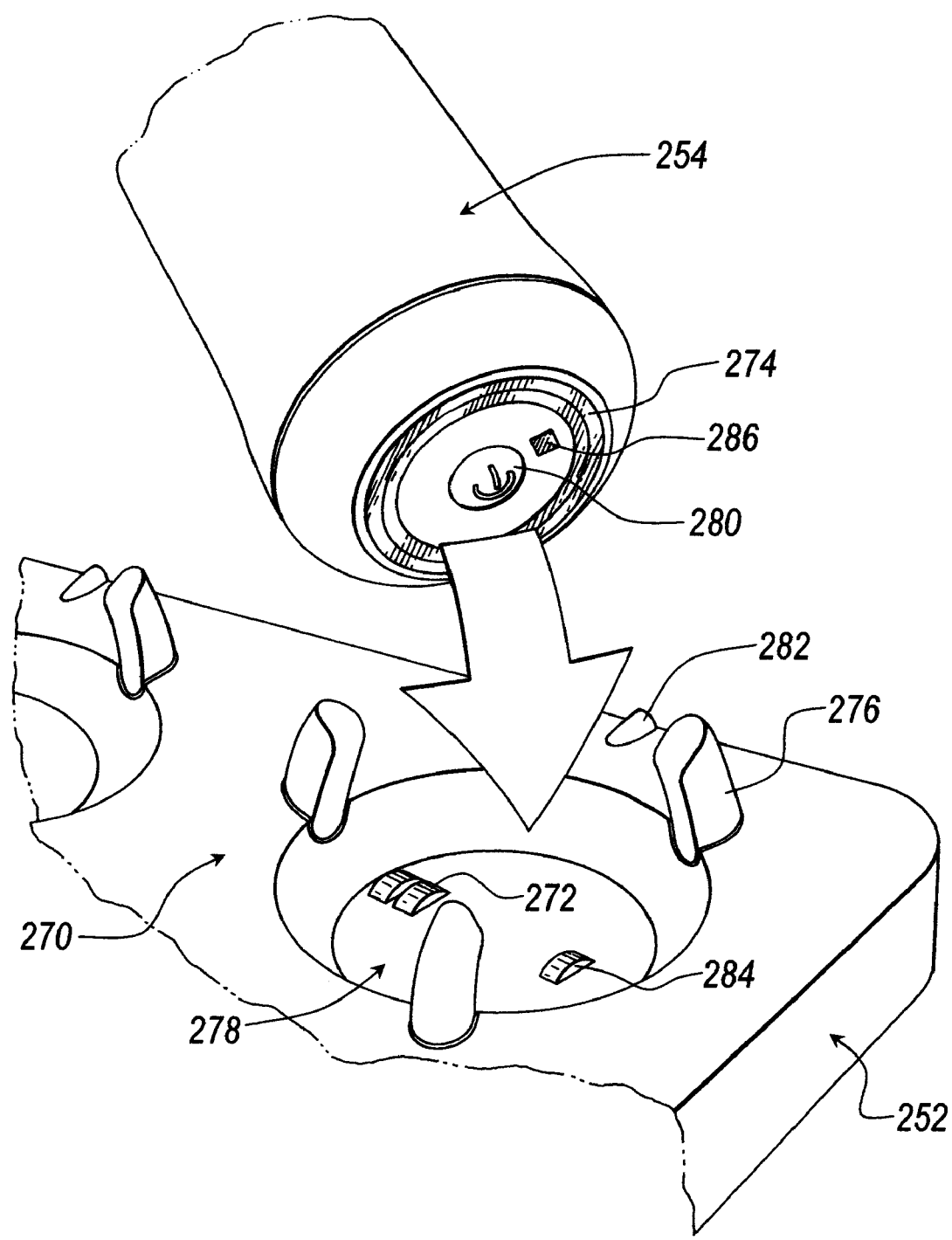
FIG. 20 is a pictorial view showing one module-to-carrier/charging base interface.

Referring now to FIG. 20, reference numeral 270 generally shows a pictorial view of one module-to-carrier/charging base interface. Unlike inductive coupling employed for the hereinabove described embodiments, contacts 272 on carrier/charging base 252 cooperate with contacts 274 to provide the charge signal to each lamp module 254 when supported on the carrier/charging base 252. Spring-loaded arms 276 are provided to hold each lamp module 254 when seated in receptacles generally designated 278 provided therefore on the carrier/charging base 252. And on/off membrane switch 280 (or other suitable means) is provided on each lamp module 254 by which they may be independently turned on/off. A charging status LED 282 for each module is provided on the carrier/charging base 252 that lights when the associated lamp module 254 is fully charged. Seat sensor contacts 284, 286 provides a seat signal used by each lamp module in a manner to be described to inhibit lighting of each lamp module when supported on the carrier/charging base if no AC power is supplied. The seat signal is preferably at ground potential, although any suitable sensor contact or other means providing any signal representative of a lamp module being in supported condition could be employed without departing from the inventive concepts.

Figure 21:
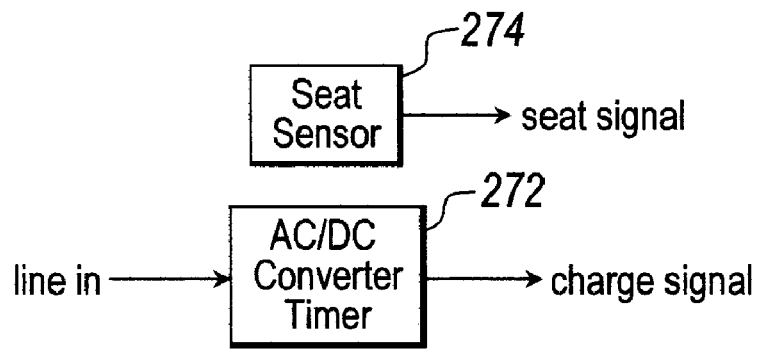
FIGS. 21 and 22 are block diagrams respectively of exemplary carrier/charging base and lamp module circuitry.

Referring now to FIG. 21, reference numeral 270 generally shows a block diagram of the carrier/charging base circuitry. As shown, an AC/DC converter 272 responds to standard AC power to provide a charge signal output signal and the seat sensor 274 provides a seat signal at ground potential. The AC/DC converter 272 preferably includes a timer to turn off the charge signal after a predetermined time determined to provide a full charge for each rechargeable battery pack.

Figure 22:
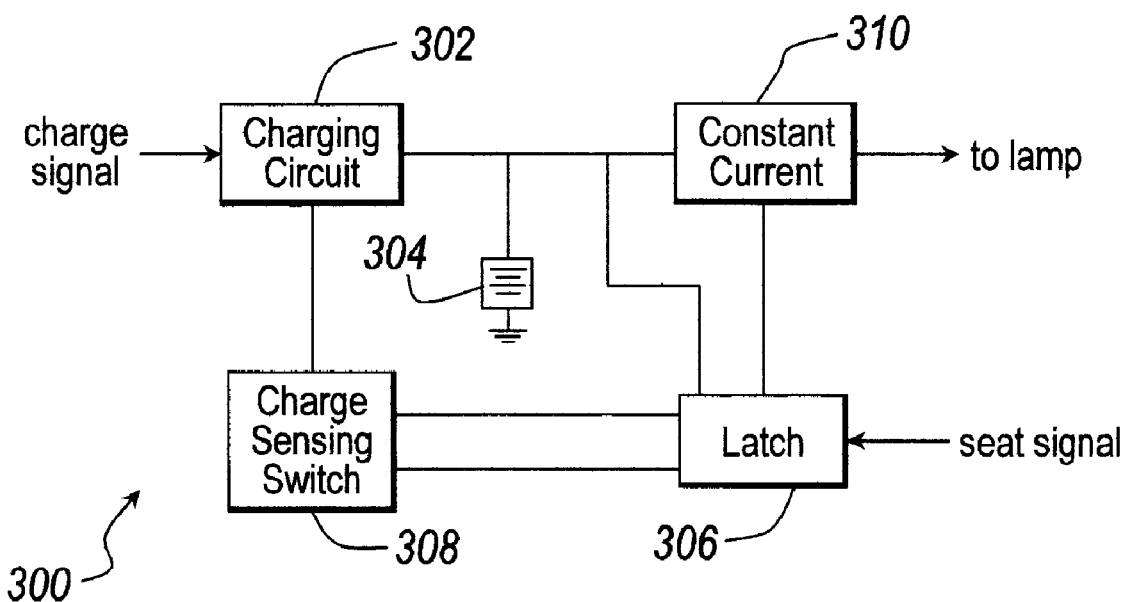

Referring now to FIG. 22, reference numeral 300 generally shows a block diagram of the lamp module circuitry. A charging circuit 302 regulates the voltage and current flowing to battery pack 304 (of each module) to prevent damage to battery pack 304. A latch circuit 306 cuts off current to each lamp when the voltage output of battery pack 304 drops below a predetermined value, thus preventing damage to battery pack 304 which could be caused by fully draining battery pack 304. Latch circuit 306 works in cooperation with a charge-sensing switch 308 to turn off current to each lamp when current is detected in charging circuit 302 or when the seat signal is detected. A constant current source circuit 310 provides a constant flow of current to each lamp. This enables the lamps to shine at a constant brightness despite fluctuations in the output current from battery pack 304. In alternate embodiments, a constant voltage source could be employed.

Figure 23:
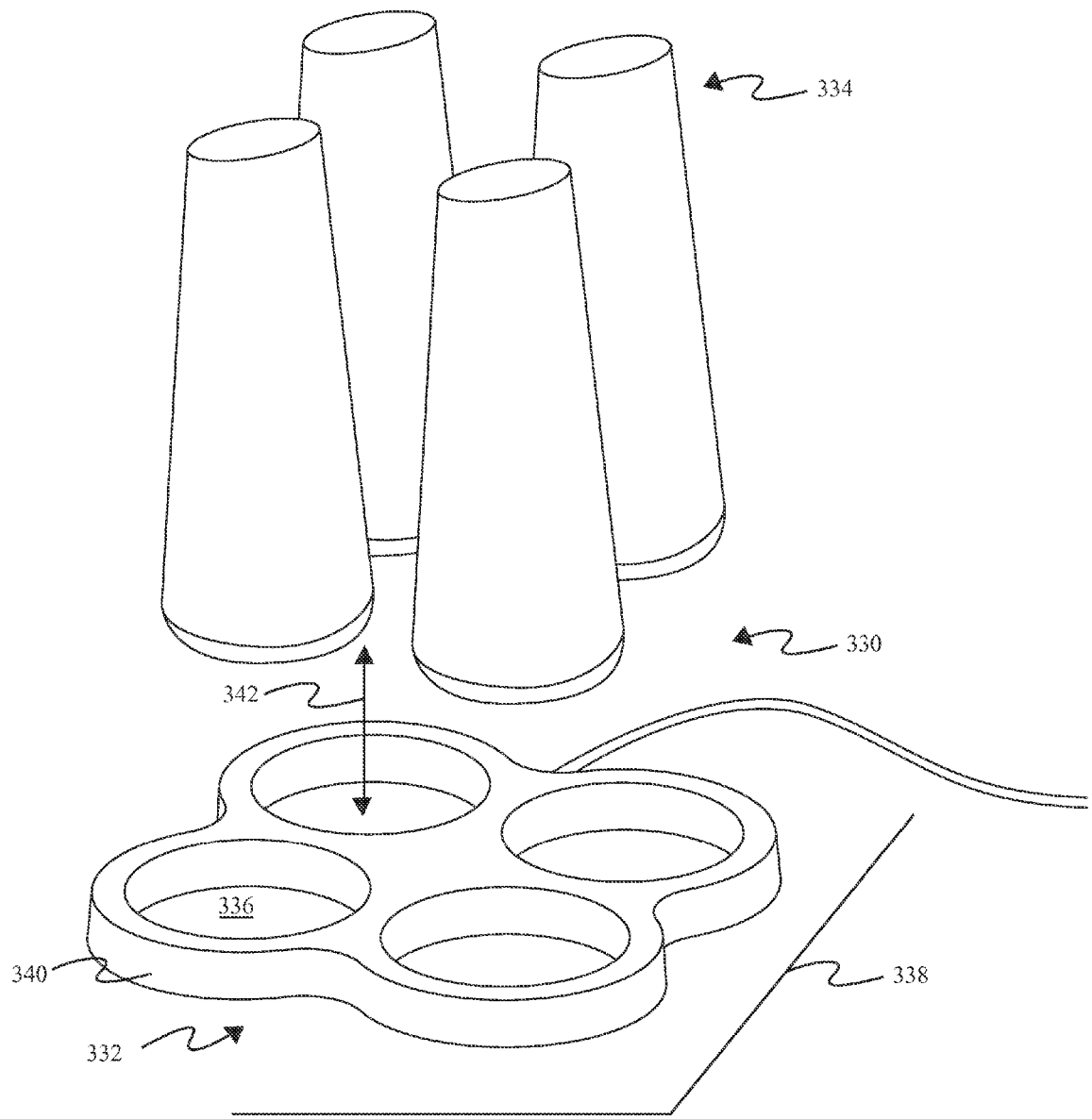
FIG. 23 is a pictorial view of another exemplary embodiment of the present invention, showing mutually movable charger and lamp members.

Referring now to FIG. 23, reference numeral 330 generally refers to another exemplary embodiment of the rechargeable lamp system of the present invention. Lamp system 330 comprises a charger generally designated 332 and four lamp modules generally designated 334. The number of lamp modules shown in the preferred embodiment is intended to be merely exemplary. It should be understood that the lamp system 330 of the present invention may be constructed with any number of modules.

As shown, the charger 332 comprises openings generally designated 336 adapted to receive each lamp module 334 such that each lamp module is supported on surface 338, such as a tabletop, and walls 340 adapted to at least partially surround the base portion of each lamp module 334. The openings 336 and walls 340 are each of generally cylindrical geometry, although another geometry may be employed without departing from the inventive concepts. As illustrated by arrow 342, the charger 332 may be moved upwardly to remove it from the lamp modules 334 while they remain standing on the support 338. An elastomeric material may be provided about the walls 340 and a support tray, not shown, may be employed to carry the charger 332 and/or lamp modules 334.

As in the embodiment described above in connection with the description of the FIGS. 1-16, each lamp module 334 is designed to be charged by magnetic induction; inductive magnetic coupling is provided by primary and secondary coils, not shown, carried within the walls 340 of the charger 332 about the openings 336 of the charger 332 and base portion of the lamp modules 334. Other coupling means such as mating electrical contacts or other means could be employed without departing from the inventive concepts.

As in the embodiment described above in connection with the description of the FIGS. 1-16, modules 334 are each designed to illuminate when not received by charger 332, either when a lamp module is removed from the charger or the charger removed from the lamp modules; or when AC power is cut off to the charger 332. The charger 332 includes a first charge circuit responsive to supplied AC power to provide a charge signal and each lamp module includes a light emitting element connected to a rechargeable battery pack via a second circuit operative in one mode to charge the rechargeable battery pack and de-light the light emitting element in response to the charge signal when each lamp module is received by the charger and operative in another mode to activate the light emitting element in response to the absence of the charge signal, whereby, each lamp module lights if removed from the charger or if the charger is removed from the lamps or if no AC power is supplied to the charger and de-lights when received thereby. The second circuit may advantageously be provided in the charger, in line with the charger, or in a power transformer appropriate for each country, or switching power adapter, or otherwise provided without departing from the inventive concepts.

Figures 24A, 24B, 24C:
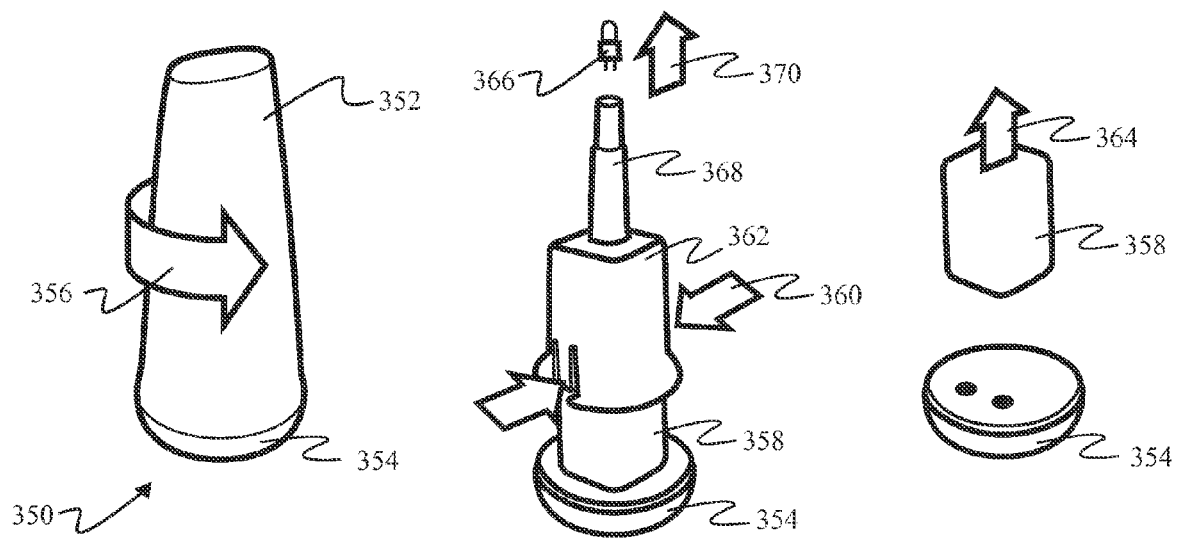
FIG. 24 in the FIGS. 24A-C thereof are pictorial diagrams of one presently preferred lamp module according to the present invention providing ease of lamp and rechargeable battery replacement.

Referring now to FIG. 24, generally designated at 350 (FIG. 24A) is one presently preferred luminary that provides ease of bulb and rechargeable battery replacement. The luminary 350 includes a diffuser 352 manually releasable from base member 354 as by manually rotating the diffuser relative to the base as illustrated by arrow 356. A rechargeable battery 358 (FIG. 24B) is manually releasable from base member 354 by pressing release fingers as illustrated by arrow 360 to detach battery compartment 362 from the base member 354 and removing the rechargeable battery 358 as shown by arrow 364 in FIG. 24C. One or more bulbs 366 are manually releasable from bulb support 368 as illustrated by arrow 370 (FIG. 24B). Light mechanical action may be employed involving a screwdriver or other instrument and/or other bulb and replaceable battery supports and mounts may be employed in alternative embodiments to provide for easy bulb and/or battery replacement without departing from the inventive concepts.

Figure 25:
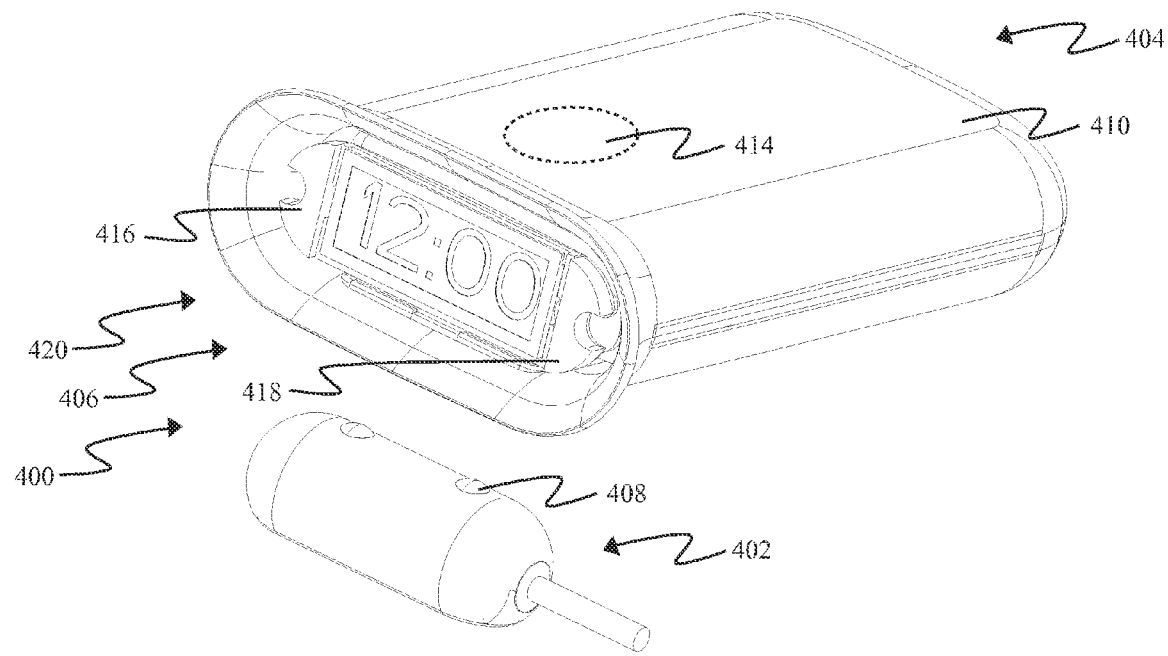
FIG. 25 is a pictorial view of the front of another lantern and charger embodiment of the autoilluminating rechargeable lamp of the present invention showing the lantern removed from the charger.
Figure 26:
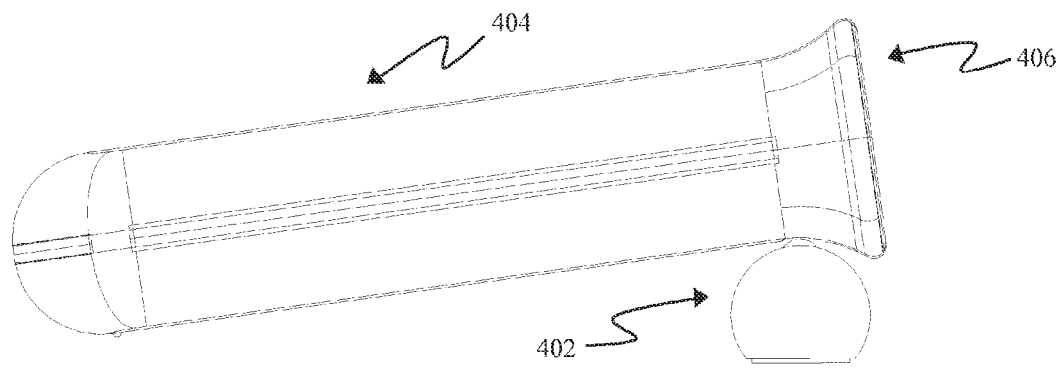
FIG. 26 is a side view of the same showing one end of the lantern received on the charger.

Referring now to FIG. 25, reference 400 generally refers to another exemplary embodiment of the autoilluminating rechargeable lamp system of the present invention. Lamp system 400 comprises a charger generally designated 402 and a lantern generally designated 404. As shown in FIG. 26, the charger 402 is adapted to receive an end of the lantern 404 such that the other end is supported on a surface, not shown, such as a tabletop, that also supports the charger 402. An alarm clock generally designated 406, transversely carried by the end of the lantern 404 adapted to be received on the charger 402, is visible when the lantern is received on the charger. The lamp system 400 provides portable lighting and a clock with alarm mode that is adapted for use while reading, using a laptop, camping, walking outdoors, and as a nightlight and alarm clock while at home or traveling. It features as appears more fully herein hidden controls providing a "clean" aesthetic and a snap-release modular construction enabling ease of battery and light emitting element replacement.

The charger 402 is adapted to receive the lantern 404 in either orientation. Preferably the charger 402 is shaped as a log upon which the lantern 404 lies in either orientation. The charger 402 includes exposed charging contacts 408 that allow the charging of the lantern 404 by resting the lantern on the contacts without having to plug the lantern into the wall or charging unit. As appears hereinbelow, the corresponding charging contacts carried by the lantern 404 also serve as a modular housing release to enable ready change of the replaceable lights and/or battery pack of the rechargeable lantern 404.

Figure 27:
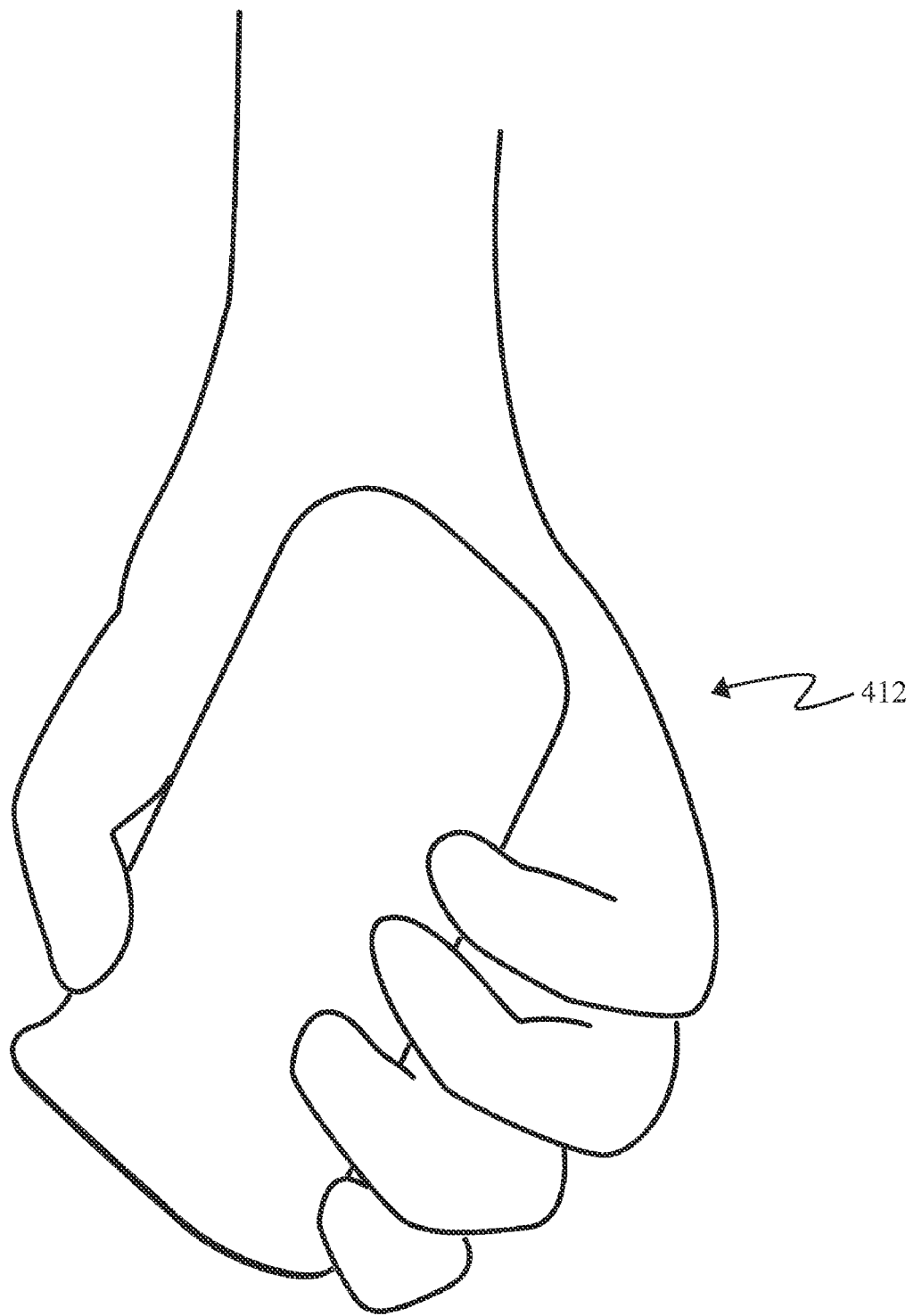
FIG. 27 shows the lantern being held in the palm.
Figure 28:
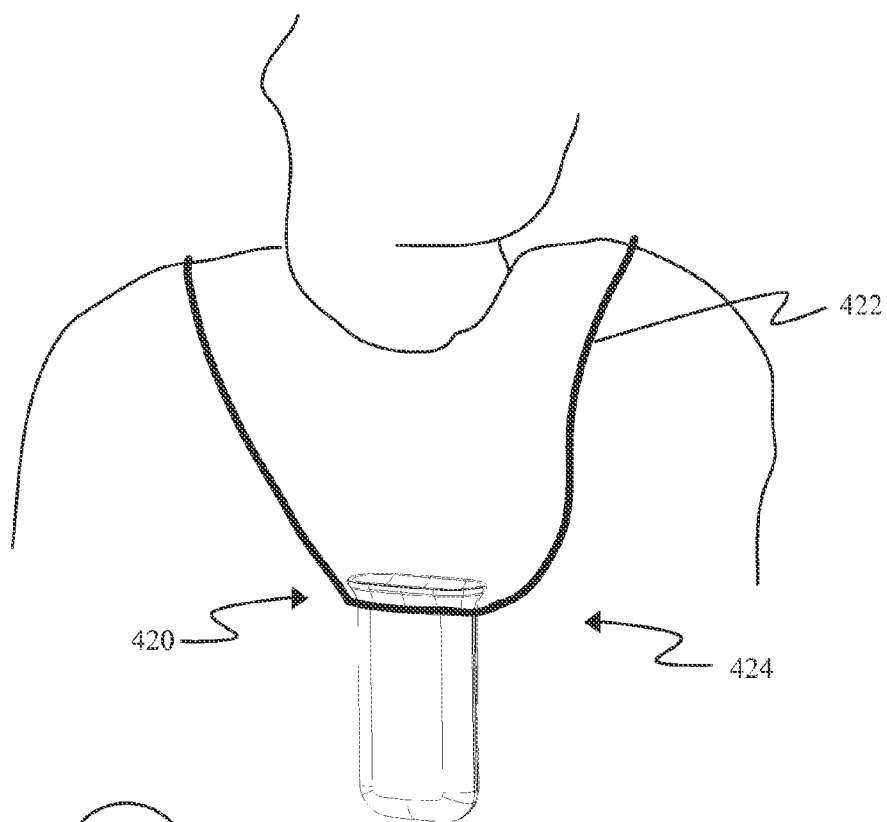
FIG. 28 shows the lantern worn about the neck.
Figure 29:
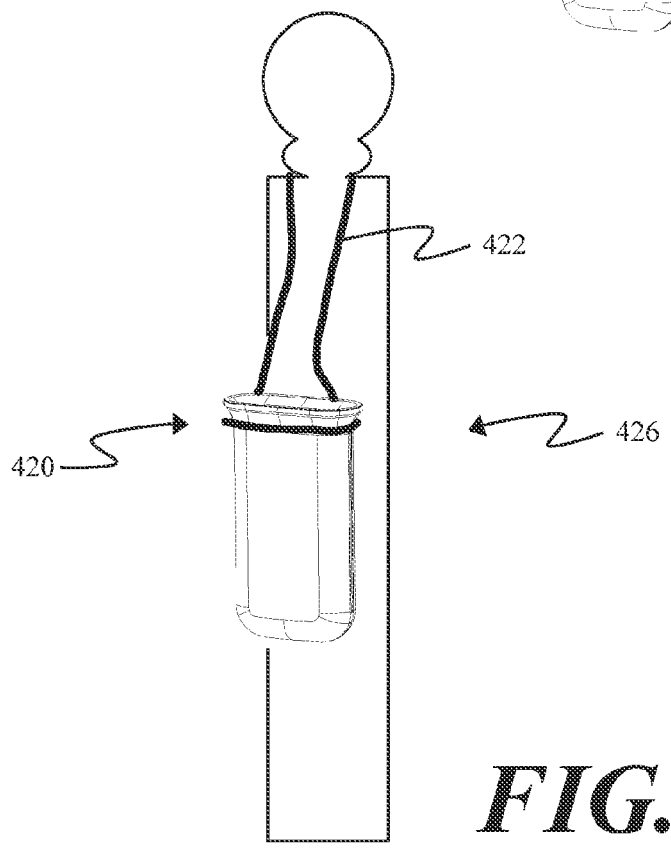
FIG. 29 shows the same hanging on a bedstead.
Figure 30:
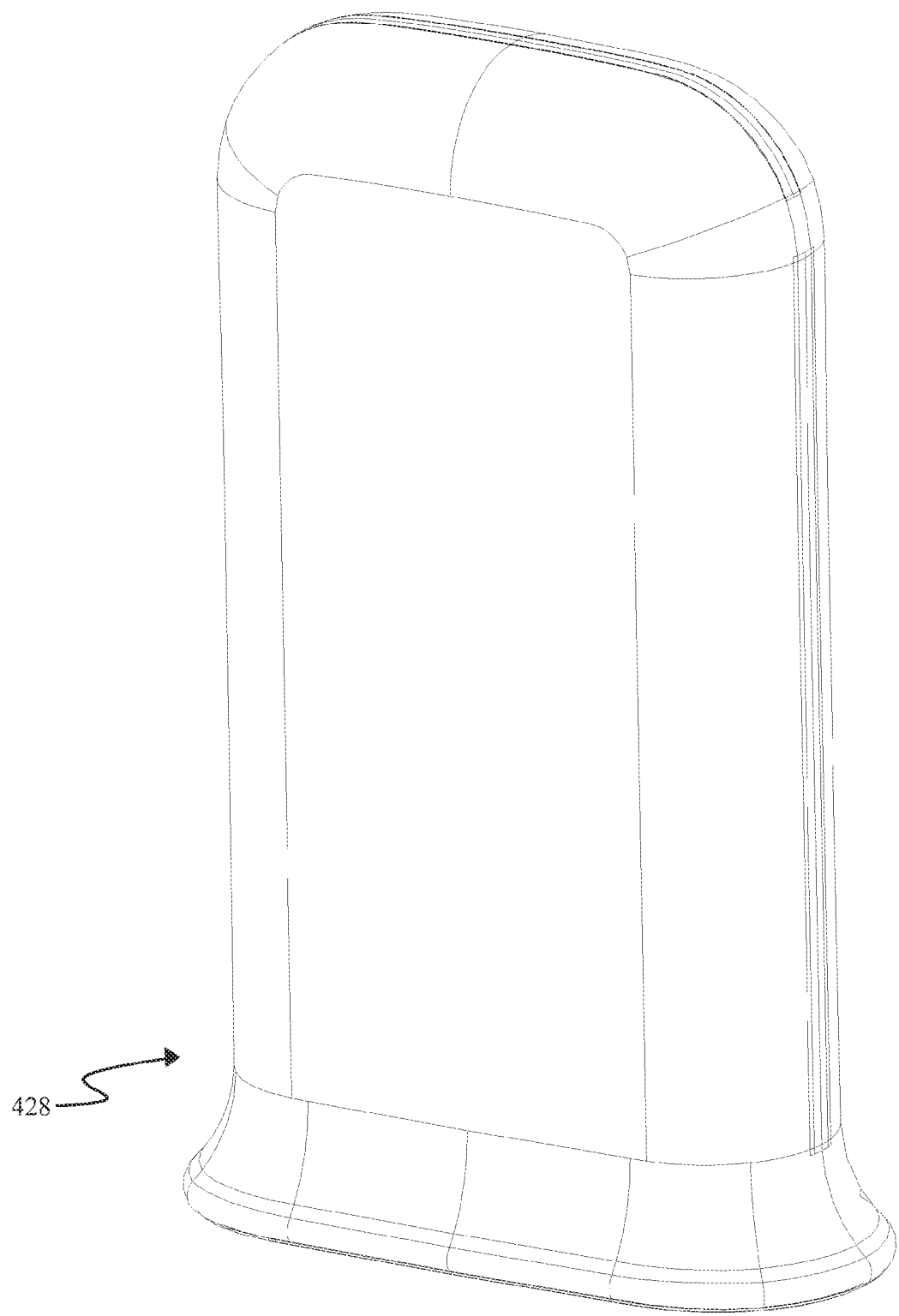
FIG. 30 is a front perspective view illustrating the lantern standing upright.

The lantern 404 includes an elongated portable case 410 with translucent sides; preferably, the case 410 is fabricated of a polycarbonate material. The case 410 of the portable, rechargeable lantern 404 is preferably so flattened as to be comfortably received in the palm of the hand as shown generally at 412 in FIG. 27. A hidden touch switch schematically shown dashed at 414, preferably a proximity switch, is provided to permit turning the lantern "on" and "off" manually. Touch-sensitive time and alarm control contacts 416, 418 are provided to set the time and alarm. The on/off proximity switch 414 and the touch sensitive switches 416, 418 provide a "clean" aesthetic although other control actuators could be employed to provide the same or a different aesthetic. A flare generally designated 420 is preferably provided about the bottom end face of the lantern 404 receiving the alarm clock 406. The flare 420 is adapted to fit in the sling of a lanyard 422 whereby it may be worn about the neck as illustrated generally at 424 in FIG. 28 or placed on a bedpost as illustrated generally at 426 in FIG. 29. The flare 420 also permits the lantern to stand upright as illustrated generally at 428 in FIG. 30.

Figure 31:
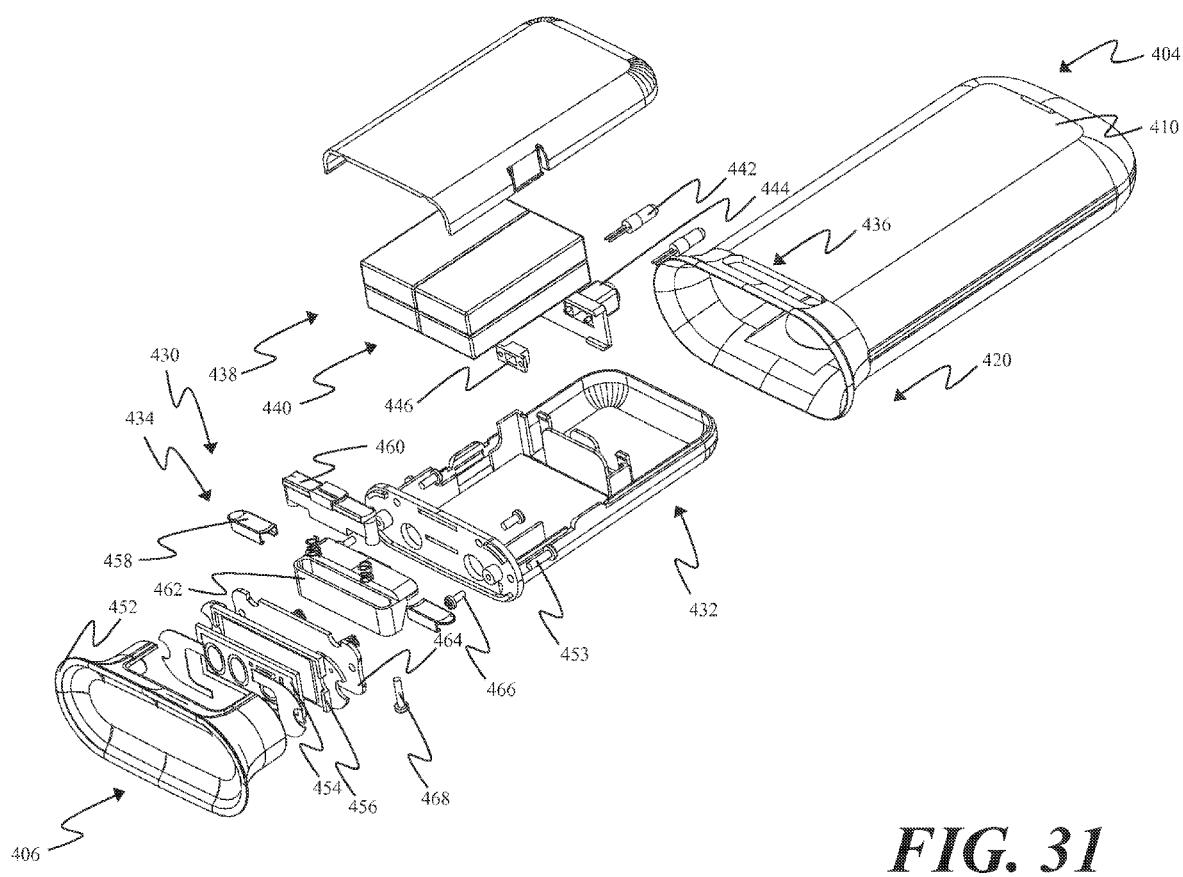
FIG. 31 is an exploded perspective view of the lantern of the autoilluminating rechargeable lamp in accord with the present invention.
Figure 32:
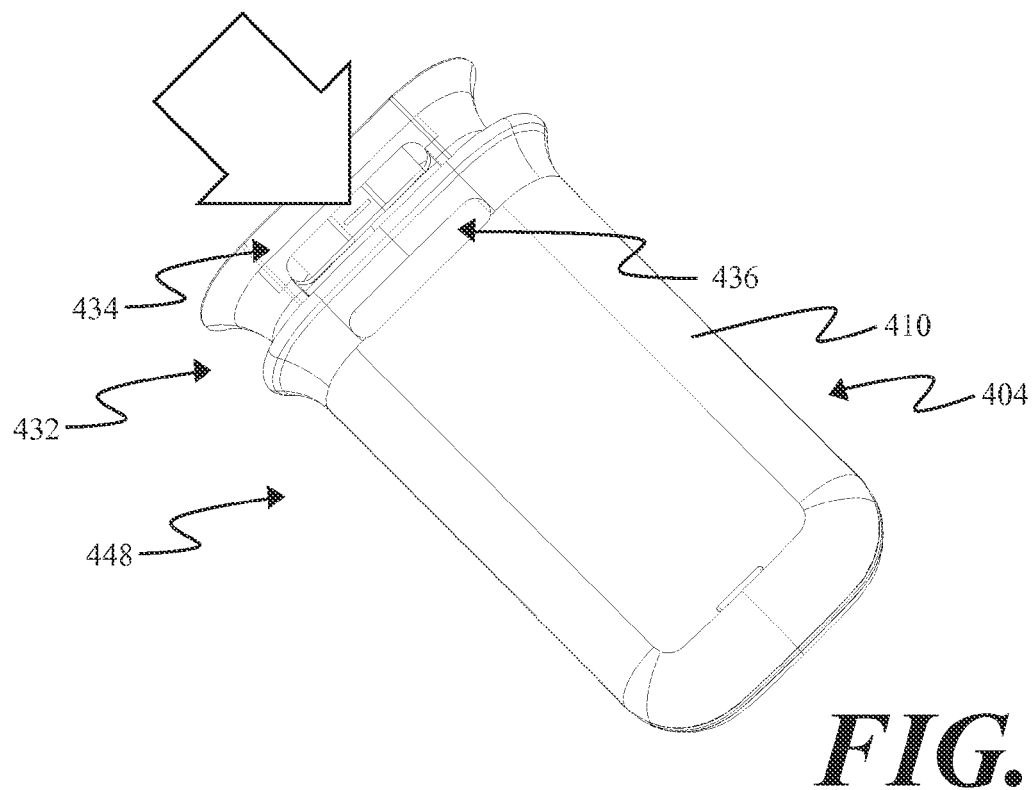
FIG. 32 is a perspective view illustrating the manner that the electrical contacts may be used to release the lantern's battery and light compartment for battery and/or bulb replacement.
Figure 33:
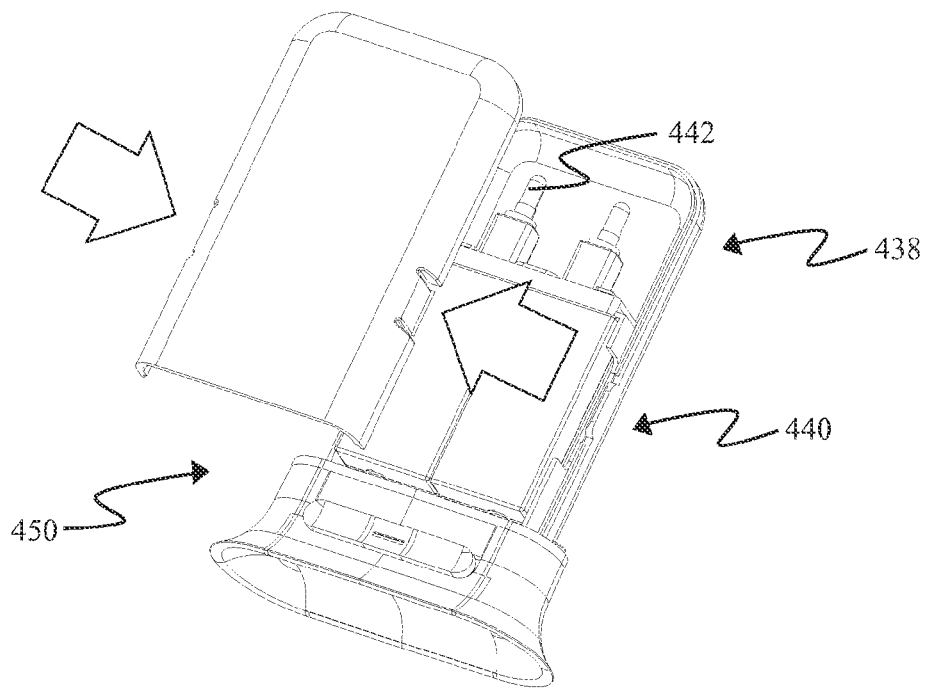
FIG. 33 illustrates the snap-release diffuser allowing for ease of replacement of the battery pack and replaceable light emitting elements.

Referring now to FIG. 31, generally designated at 430 is an exploded perspective view of the lantern of the autoilluminating rechargeable lamp system of the present invention. The case 410 of the lantern 404 is releasably mounted to a diffusor/clock assembly generally designated 432 by means of a contact release assembly generally designated 434. The case 410 of the lantern 404 is provided with an elongated opening generally designated 436 that is adapted to removably receive spring loaded release contacts to be described. The diffuser/clock assembly 432 includes a snap-release diffuser generally designated 438 that serves as a housing structure to mount printed circuit boards, lights and batteries. A battery pack generally designated 440, preferably a (4.8 V 600) mAh rechargeable NiMH battery, is releasably mounted in the snap-release diffuser 438. Replaceable lamps 442 carried by a holder 444 and socket mount 446 are releasably mounted in the snap-release diffuser 438. The contact release assembly 434 and opening 436 permit ready releasing of the diffuser/clock assembly 432 from the case 410 of the lantern 404 as illustrated generally at 448 in FIG. 32. The snap-release diffuser 438 permits ready replacement of the battery pack 440 and/or the lights 442 as illustrated generally at 450 in FIG. 33.

The diffuser/clock assembly 432 includes a flared lens 452 adapted to fit into flare 420 that is fastened to the snap-release diffuser 438 as by threaded fasteners 453. The flared lens 452 serves to secure the clock 406 at the bottom face of the lantern 404. The clock 406 includes an LCD 454 and a back light assembly 456. Preferably, the clock 406 includes a mirror backed LCD with dual printed circuit board mounted side-emitting amber LED back lights.

The contact release assembly 434 includes electrical contacts 458 mounted on spring-loaded rocker arms 460 carried by a socket 462 sandwiched between the snap-release diffuser 438 and a printed circuit board assembly 464 that is fastened to the snap-release diffuser 438 as by threaded fasteners 466. The fasteners 468 serve to attach the rocker arms 460 in the socket 462.

Figure 34:
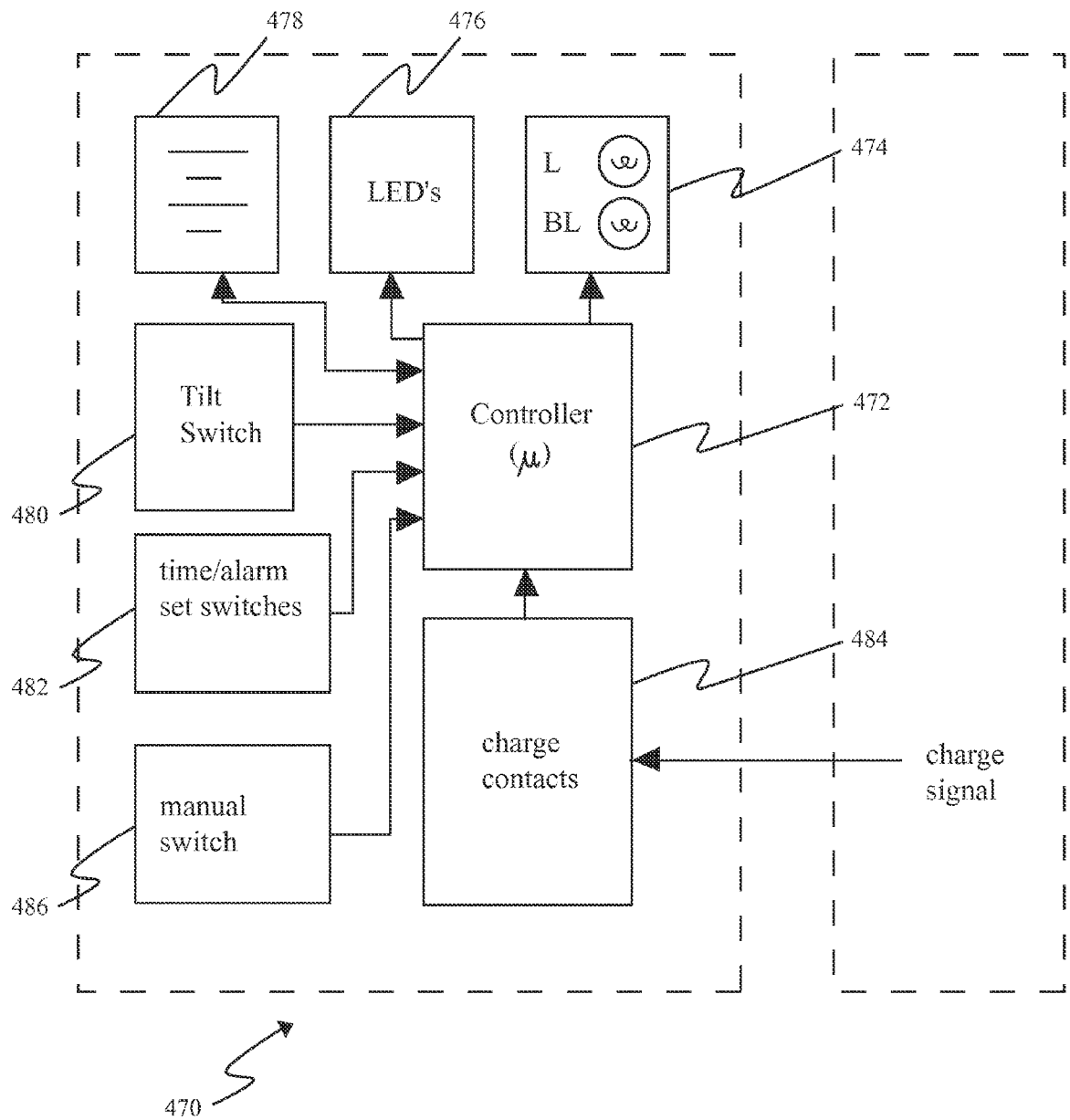
FIG. 34 is an electrical block diagram of the autoilluminating rechargeable lamp of the present invention.

Referring now to FIG. 34, generally designated at 470 is an electrical block diagram of the autoilluminating rechargeable lamp system in accord with the present invention. A control circuit preferably implemented with a microprocessor 472 is operatively connected to the lights and back lights 474, the alarm clock LED's 476 and to the rechargeable battery pack 478. A tilt switch 480 may be connected to the controller 472. The time and alarm setting touch switches 482 are operatively connected to the controller 472, as are the charging contacts 484. The manual control proximity contact switch 486 is operatively connected to the controller 472.

When the power button 486 is pressed and released, it overrides any other mode that the system may be in. When pressed and released, it turns the lantern's lights and back lights "on" and "off," preferably with a soft transition. When the power button is pressed, and held for a predetermined time period, such as two (2) seconds, the lamp system goes into sleep mode, which disables all of the control functions enabling safe package as in a suitcase and/or safe transport.

Figure 35:
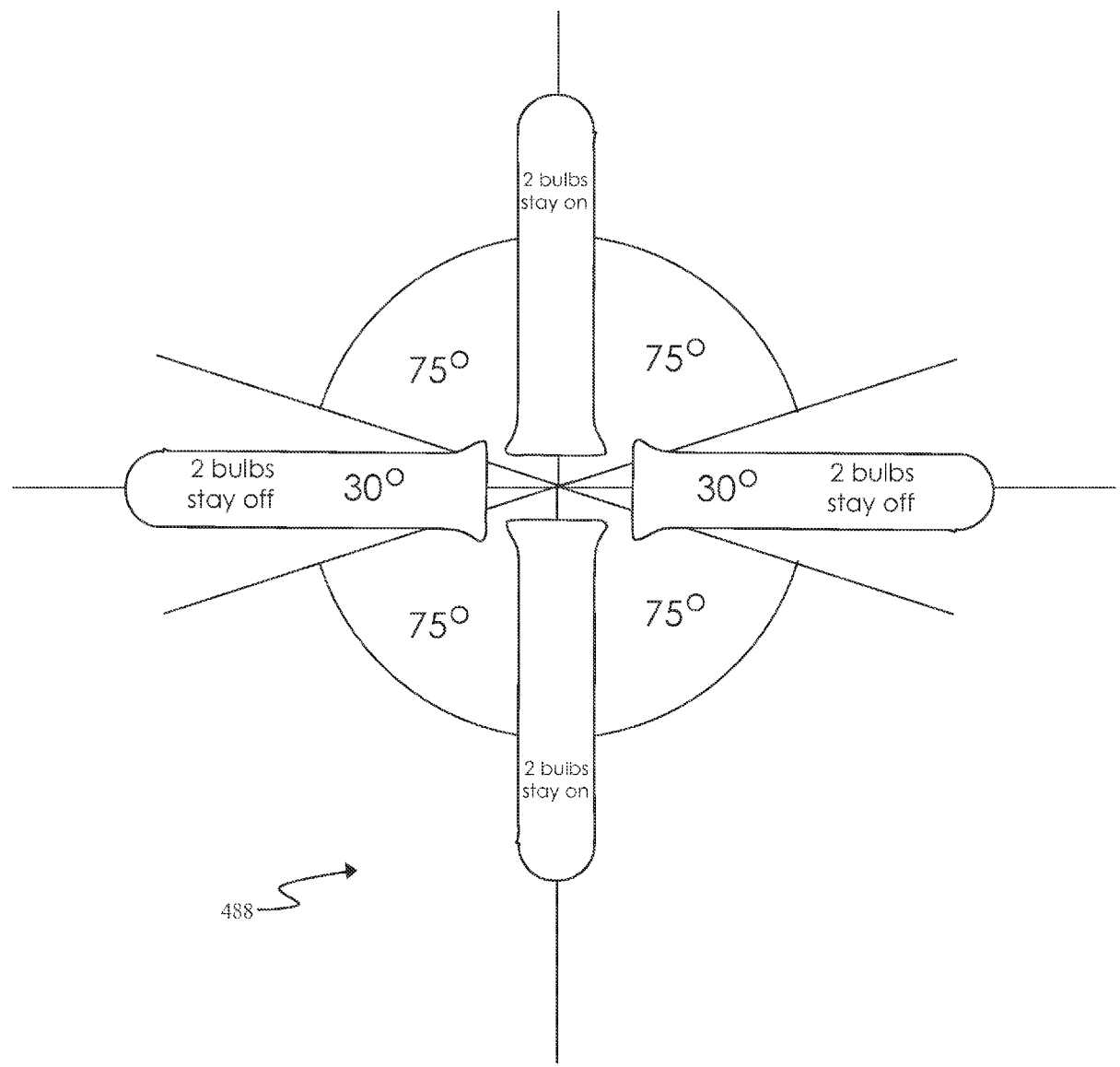
FIG. 35 is a schematic diagram useful in explaining the lantern's orientation responsive light modes in accord with the present invention.

As in the other embodiments described hereinabove, the circuitry causes the lantern to illuminate when not received on the charger and to de-light when received thereon. The back light for the alarm and clock LEDs are controlled thereby to operate similarly. Preferably, both the lantern's lights and back lights turn on/off with soft transition. In an alternative embodiment, the tilt switch or other orientation responsive circuitry is responsible for illuminating the lantern and LED's when the lantern is up-ended in a predetermined orientation and to de-light the same when down-ended in a predetermined orientation. In one presently preferred embodiment, the tilt switch is used to cause the lantern and the back light to go "on" and "off" for the orientation's generally designated 488 in FIG. 35, it being understood that other light modes or orientation's would be possible.

Figure 36:
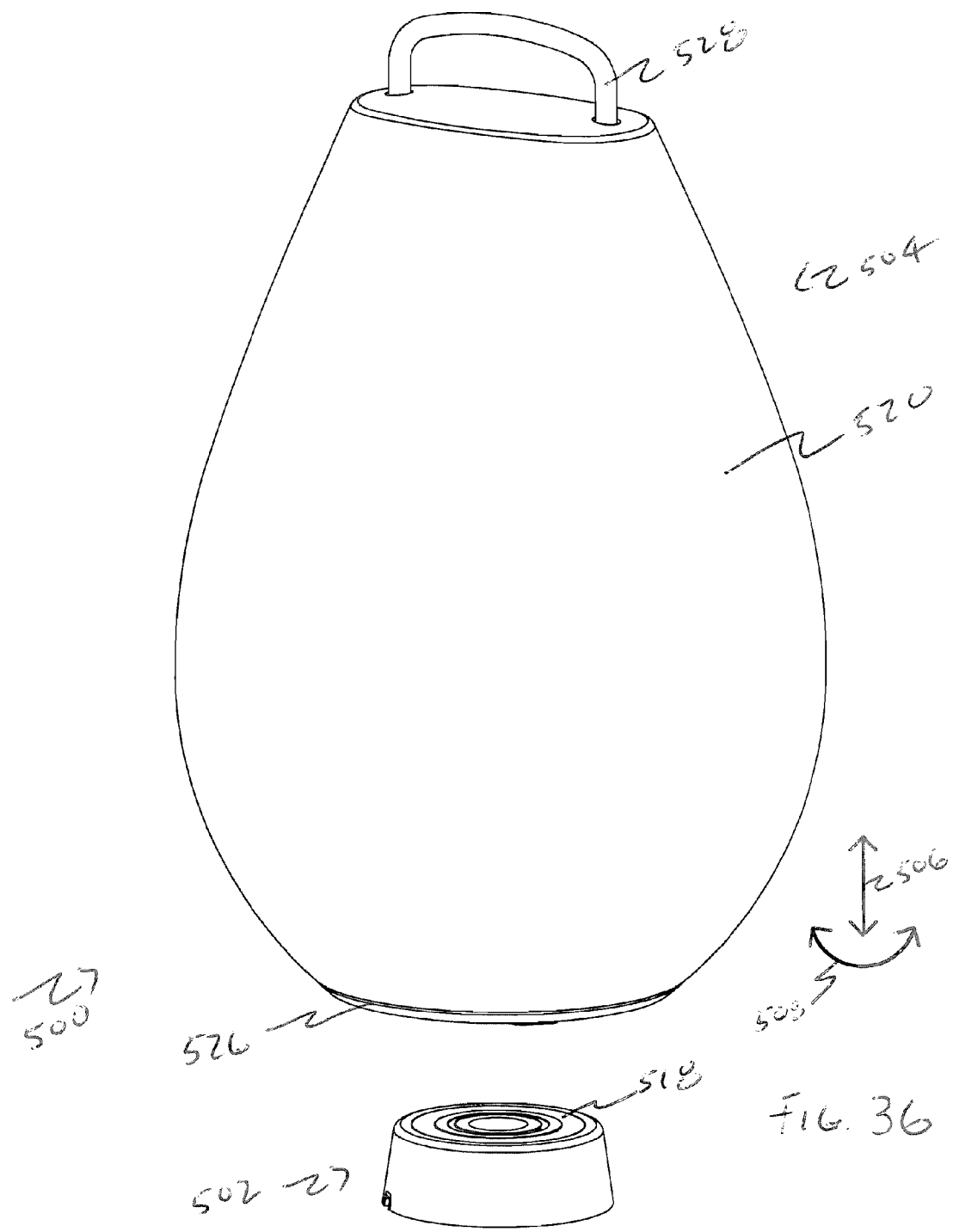
FIG. 36 is a pictorial view of another exemplary embodiment of the present invention, showing a charging base and removable and rotatable lantern module.

Referring now to FIG. 36, generally designated at 500 is a pictorial view of another exemplary embodiment in accord with the autoilluminating rechargeable lamp system of the present invention that provides a portable luminary of comparatively high luminosity suitable for indoor and outdoor use. The lamp system 500 includes a charging base generally designated 502 and a rechargeable lantern module generally designated 504. As schematically illustrated by arrow 506, the lantern module 504 is removable from and replaceable on the charging base 502, in response to which the lantern module in one exemplary mode autoilluminates when removed and de-lights when replaced. As schematically illustrated by arrow 508, the lantern module is rotatable about its axis of extension both on and off of the charging base 502, in response to which the lantern module in another exemplary mode progressively dims and is brightened in dependence on the direction and degree of rotation.

The lantern module 504 autoilluminates when removed from the charging base 502 or when no AC power is supplied to the charging base and it de-lights when replaced on the charging base 502. The lantern module preferably lights to one half intensity when removed and is turned off when replaced on the charging base. When removed, the half intensity is progressively dimmed in response to turning the lantern module about its axis counterclockwise till it de-lights when turned through (forty-five) 45° or more and the half intensity is progressively brightened in response to turning the lantern module about its axis until it has been turned through forty-five degrees (45°) or more clockwise when it remains at maximum intensity. When turned when seated, it lights to half intensity. The half intensity is progressively dimmed in response to turning the lantern module about its axis counterclockwise till it de-lights when turned through (forty-five) 45° or more and the half intensity is progressively brightened in response to turning the lantern module about its axis until it has been turned through forty-five degrees (45°) or more clockwise when it remains at maximum intensity. If rotated about its axis less than the 45° angular rotation threshold, it remains at the intensity it last exhibited whether on or off the charging base 502 till it is once more removed or replaced, which de-lights it when replaced no matter what intensity it had off the base and which lights it to half maximum no matter what intensity is had on the charging base. As will be readily appreciated by those of skill in the art, the priority of the autoilluminating mode to reset the brightness to half maximum intensity and to de-light no matter what intensity achieved in rotodimming mode of the presently preferred embodiment is exemplary only, as other relations between modes and other modal parameters are possible, and it will be further appreciated that the rotodimming mode of the presently preferred embodiment is exemplary only, as lighting protocols other than dimming/brightening, such as randomly generated and/or dynamically changing light or intensity sequencing, and other modal parameters are possible in response to clockwise and counterclockwise rotation of the lantern module about its axis of elongation.

Figure 37:
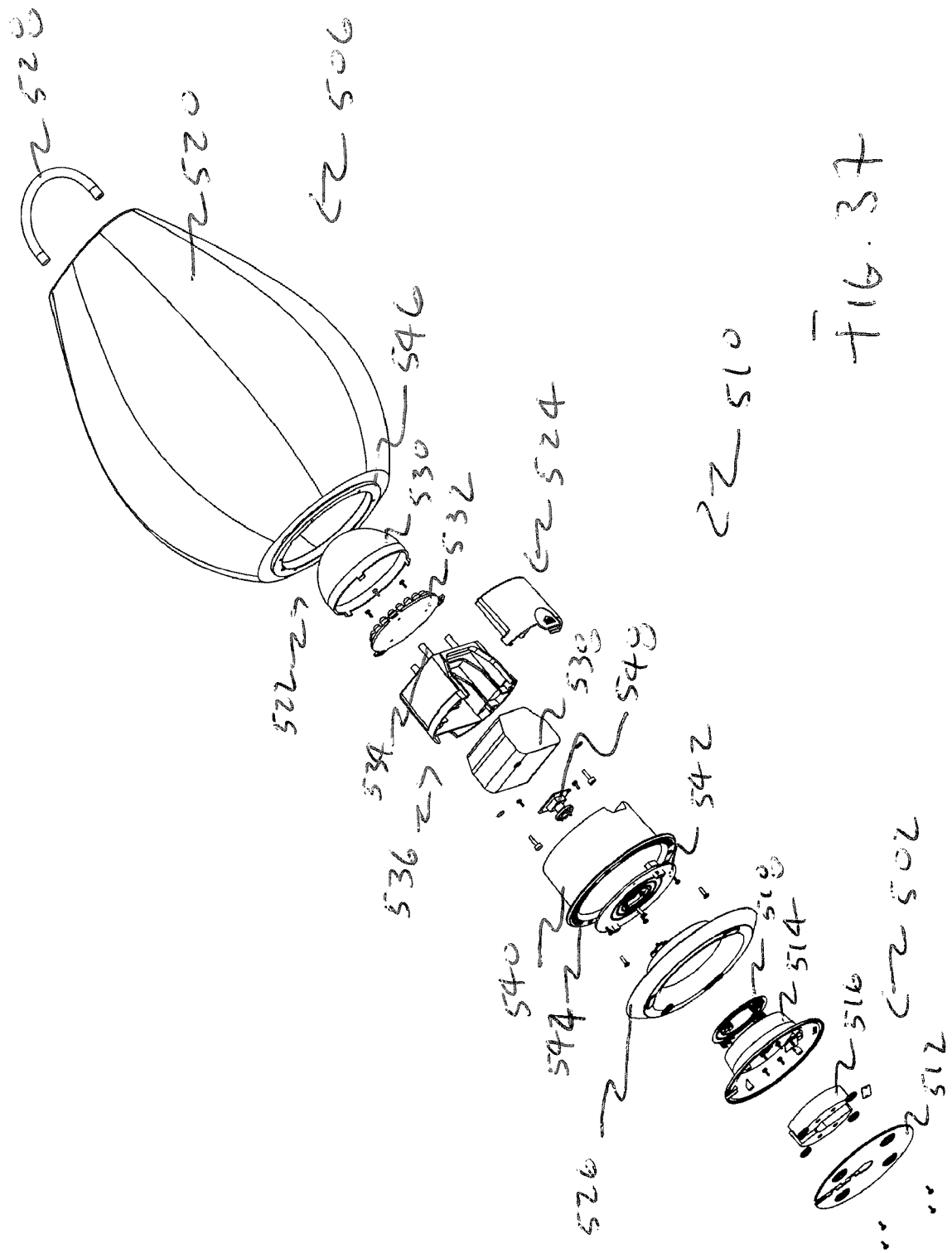
FIG. 37 is an exploded perspective view thereof.

Referring now to FIG. 37, reference 510 generally refers to an exploded perspective view of an exemplary charging base and removable and rotatable lantern module embodiment in accord with the autoilluminating rechargeable lamp system of the present invention. Lamp system 510 comprises the charging base generally designated 502 and the lantern module generally designated 506 that is removable and replaceable from and to the charging base and that is rotatable about its axis of elongation both on and off the charging base. The charging base 502 includes bottom plate 512, hollow cover 514 and charging circuitry 516 mounted therebetween. As in the other embodiments described hereinabove, the charging circuitry 516 provides a charging signal to the lantern module 506 in response to supplied AC power. A plurality of concentric, annular electrodes 518, best seen in FIG. 36, carried by the exposed top of the hollow cover member 514 couple the charging signal to the lantern module when the lantern module 504 is received on the charging base 502 for any given state of angular rotation of the lantern module 504 about its axis of elongation.

The lantern module 506 includes a bulbous translucent cover 520, preferably blow molded, having a hallow interior and an open bottom 522, a rechargeable light subassembly generally designated 524 mounted for rotation with the transparent cover 520 and an annular foot piece 526 rotatably mounted to the translucent cover 520 of the lantern module 506. As best seen in FIG. 36, the translucent cover 520 and annular foot piece 526 are relatively rotatable about the axis of extension of the lantern module 504. A handle 528 is attached at the top of the translucent cover 510 which provides for ease of transport and handling of the lamp module 506.

The rechargeable light subassembly 524 that provides ease of light and rechargeable battery replacement includes a diffuser 530 manually releasable from LED assembly 532 as by manually deflecting the diffuser relative to the LED assembly. The LED assembly has a plurality of white LED's, preferably thirty six (36) in number, and is mounted on posts 534 carried by, preferably injection molded, snap release base member generally designated 536; the posts provide for air cooling of the exposed underside of the LED assembly 532. The rechargeable lantern module 504 provides comparatively high luminosity, up to about fifty (50) lumens for six (6) hours before needing to be recharged in the presently preferred embodiment. Other at least one light elements such as florescent lamps selected to provide comparatively long-lasting and bright illumination may be employed.

A rechargeable battery 538 is manually releasable from base member 536 by releasing the door of the snap release base member 536. The snap release base member 536 is fastened to a cup shaped electrical housing 540 that carries a circuit board 542 operatively connected to the rechargeable battery pack 538 and to the LED assembly 532. The electrical housing 540 includes an annular flange 544 that is fastened to an annular flange 546 disposed about the open mouth 522 of the translucent cover 520 thereby mounting it for rotation therewith. The annular foot piece 526 is journaled for rotation to the electrical housing 540 and thereby for rotation relative to the translucent cover 520 about the axis of extension of the lantern module 506. A potentiometer 548 is mounted to the electrical connector housing 540 with its spindle mounted for rotation with the annular foot piece 526; the potentiometer 548 provides a signal representative of the relative rotation of the translucent cover 520 and annular foot piece 526 about the axis of extension of the lantern module 506.

Contacts, not shown, operatively connected to the circuit board 542 are mounted to the connector housing 540 to couple the charge signal from the charging base 502 to the rechargeable battery pack 538; a spring loaded contact, not shown, operatively connected to the circuit board 542 is mounted to the connector housing 540 to provide a signal representative that the lantern module 506 is seated on the charging base 502; and a keying arrangement, not shown, is provided between the hollow cover 514 of the charging base and the rotatable annular foot piece 526 of the lantern module to prevent relative rotation of the annular foot piece 526 of the lantern and the hollow cover 514 of the charging base when the lantern is seated thereon, while allowing the translucent cover 520 to rotate relative to the annular foot piece 526.

Figure 38:
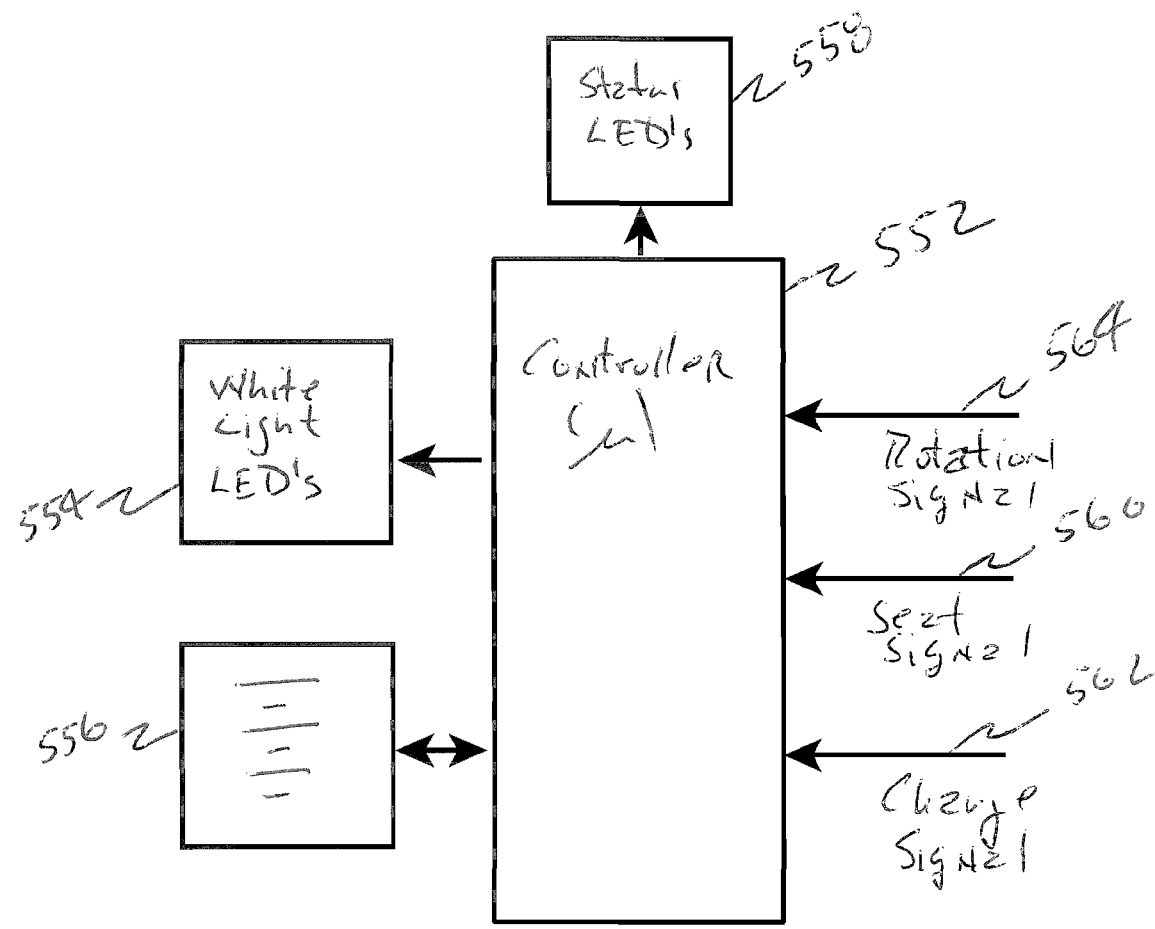
FIG. 38 is an electrical block diagram of the embodiment of the autoilluminating rechargeable lamp of the present invention of the FIGS. 36, 37.

Referring now to FIG. 38, generally designated at 550 is a block diagram of the electrical circuitry of the autoilluminating rechargeable lamp system of the present invention. A controller 552 including a microprocessor is operatively connected to the array of white light LED's 554, the rechargeable battery 556 and to status LED's 558. In response to the seat signal 560 and to the charge signal 562, the controller 552 in one mode is operative to light to one half intensity the LED's 554 when the lantern module is removed from the charging base or no AC power is supplied and to de-light the LED's 554 when replaced on the charging base. In this mode, the controller 552 is further operative to charge the rechargeable battery pack 556, when the lantern module is received on the charging base, and to light the status LED's 558 to provide a visual signal indication of battery status, whether charging or fully charged. In response to the rotation signal 564, the controller 552 in another mode is operative to progressively dim the LEDs 554 in response to turning the lantern module about its axis counterclockwise till it de-lights when turned through (forty-five) 45° or more and the half intensity is progressively brightened in response to turning the lantern module about its axis until it has been turned through forty-five degrees (45°) or more clockwise when it remains at maximum intensity. If rotated about its axis less than the 45° angular rotation threshold clockwise or counterclockwise, it remains at the intensity it last exhibited, whether on or off the charging base 502, till it is once more removed or replaced, which de-lights it when replaced no matter what intensity it had off the base and which lights it to half maximum no matter what intensity is had on the charging base. As will be readily appreciated by those of skill in the art, the lighting protocols implemented in said one and other modes are exemplary only, as other lighting parameters and control strategies could be employed in response to removal and replacement and/or rotation than to light, de-light and control intensity; the implementation of the rotation signal using a potentiometer controlled by the relative rotation of the annular foot and translucent cover of the lantern module is exemplary only, as other ways, e.g., that sense a parameter such as pointing direction or that detect lantern rotation relative to its support, or segmented contacts and hardwired control logic, or other ways to provide a signal representative of the rotation of the lantern module could be employed; and the implementation of the seat signal using a mechanical contact is exemplary only, as other ways, e.g., that employ the charge signal, to provide a signal representative that the lantern is seated on its charging base could be employed.

The present invention in its broader aspects is not limited to the described embodiments, and departures may be made therefrom without departing from the principles of the invention and without sacrificing its primary advantages. Obviously, numerous modifications may be made to the present invention. Thus, the invention may be practiced otherwise than as specifically described herein. One feature of one embodiment may be employed in another disclosed embodiment. The power cord may be made removable to base placement without cord limitations. Other modifications will be readily apparent to one of skill in the art without departing from the scope of the present invention.

What is claimed is:

1. An autoilluminating rechargeable lamp system providing comparatively high luminosity in a manner that is portable and suitable for indoor and outdoor use, comprising:
   a charger module adapted to mate with and receive a lantern module, including a first circuit coupled to said received lantern module operative in response to supplied AC power to provide a charge signal to the lantern module received thereby; and
   a lantern module rotatable about its axis of extension that is received by said charger module, the lantern module including at least one light emitting element connected to a rechargeable battery pack via a second circuit operative in one mode to charge said rechargeable battery pack and to de-light said at least one light emitting element in response to receipt of the lantern module on the charger module and to activate said at least one light emitting element in response to removal of the lantern module from said charger module and operative in another mode to controllably alter the light emitting characteristics of the at least one light emitting element in response to rotation of the lantern module about its axis of extension.

2. The invention of claim 1, wherein the second circuit in said other mode controllably dims/increases the intensity of the at least one light emitting element in response to rotation of the lantern module about its axis of extension.

3. The invention of claim 1, wherein the lantern module includes a bulbous translucent cover inside which an array of comparatively bright white LED's is disposed to provide said at least one light emitting element.

4. The invention of claim 1, wherein the lantern module has a handle at a top end that provides easy portability.

5. The invention of claim 1, wherein said lantern module includes relatively rotatable cover and foot portions, and said second circuit includes at least one circuit element responsive to relative rotation therebetween to provide a signal representation of relative rotation.

6. The invention of claim 1, wherein said second circuit includes at least one circuit element responsive to receipt or removal of the lantern module on or off said charger module to provide a signal representation of whether or not the lantern module is seated on the charger module.

7. The invention of claim 1, wherein said second circuit operative in said one mode to charge said rechargeable battery pack and to de-light said at least one light emitting element in response to receipt of the lantern module on the charger module and to activate said at least one light emitting element in response to removal of the lantern module from said charger module is further operative to light the at least one light emitting element in response to non-detection of the charge signal resulting from lack of AC power, either due to a power failure or unplugging the charger module.

8. An autoilluminating rechargeable lamp system providing comparatively high luminosity in a manner that is portable and suitable for indoor and outdoor use, comprising:
   a charger module adapted to receive the bottom end of a lantern module rotatable about its axis of extension, including a first circuit coupled to said received bottom end operative in response to supplied AC power to provide a charge signal to the lantern module received thereby irrespective of a state of angular rotation of the lantern module; and
   a lantern module elongated about an axis of extension having a foot member at its bottom end that is received by said charger module and a translucent lantern cover member upstanding from and rotatable relative to said foot member about the axis of extension including an array of white light LED's and a rechargeable battery pack connected to a controller mounted inside said lantern module operative in one mode to charge said rechargeable battery pack and to de-light said array in response to receipt of the foot member of the lantern module on the charger module and to activate said array in response to removal of the lantern module from said charger module and operative in another mode to controllably alter the light emitting characteristics of the array in response to relative rotation of the translucent cover and foot members of the lantern module about its axis of extension.

9. The invention of claim 8, wherein said controller in said controllably altering mode controllably alters the intensity by progressively dimming and brightening the intensity of the array of white light LED's in response to clockwise and counterclockwise rotation of the translucent cover relative to the foot members about the axis of extension of the lantern module.

10. The invention of claim 8, wherein a seat sensor supplies a seat signal representative of whether said foot member of said lantern module is received on the charger module or the lantern module is removed therefrom.

11. The invention of claim 10, wherein a potentiometer supplies a signal representative of relative rotation of the translucent cover and foot members of the lantern module about the lantern module axis of extension.

12. An autoilluminating rechargeable lamp system providing comparatively high luminosity in a manner that is portable and suitable for indoor and outdoor use, comprising:

a charger module having a first circuit; and a lantern module having at least one light emitting element connected to a rechargeable battery pack, a second circuit, and a potentiometer, wherein the lantern module is removably receivable and supportable by the charger module, the charger module first circuit is coupled to the lantern module when received thereon, the first circuit is operative in response to supplied AC power to provide a charge signal to the lantern module when received on the charger module, the lantern module second circuit is operative in one mode to charge said rechargeable battery pack and to de-light said at least one light emitting element in response to receipt of the lantern module on the charger module and to activate said at least one light emitting element in response to removal of the lantern module from said charger module and operative in another mode to controllably alter the light emitting characteristics of the at least one light emitting element, the lantern module and charger module have engaging structure to adjust the lantern module potentiometer by rotation of the lantern about an axis of extension thereof when received by the charger module, and the potentiometer alters the light emitting characteristics in response to rotation of the lantern module about its axis of extension.

* * * * *